United States Patent
Miyawaki

(10) Patent No.: US 11,575,289 B2
(45) Date of Patent: Feb. 7, 2023

(54) WIRE CONNECTION METHOD FOR ELECTRICAL ROTATING MACHINE, METHOD OF MANUFACTURING ELECTRICAL ROTATING MACHINE, WIRE CONNECTION STRUCTURE OF ELECTRICAL ROTATING MACHINE, AND ELECTRICAL ROTATING MACHINE

(71) Applicant: ODAWARA ENGINEERING CO., LTD., Kanagawa (JP)

(72) Inventor: Noburo Miyawaki, Kanagawa (JP)

(73) Assignee: ODAWARA ENGINEERING CO., LTD., Kanagawa (JP)

(*) Notice: Subject to any disclaimer, the term of this patent is extended or adjusted under 35 U.S.C. 154(b) by 286 days.

(21) Appl. No.: 16/913,732

(22) Filed: Jun. 26, 2020

(65) Prior Publication Data

US 2020/0328646 A1    Oct. 15, 2020

Related U.S. Application Data

(63) Continuation of application No. PCT/JP2018/038842, filed on Oct. 18, 2018.

(30) Foreign Application Priority Data

Dec. 29, 2017   (JP) .............................. JP2017-255168

(51) Int. Cl.
*H02K 3/28* (2006.01)
*H02K 15/00* (2006.01)

(52) U.S. Cl.
CPC ........... *H02K 3/28* (2013.01); *H02K 15/0081* (2013.01)

(58) Field of Classification Search
CPC .. H02K 3/12; H02K 3/14; H02K 3/28; H02K 15/0414; H02K 15/0421; H02K 15/06;
(Continued)

(56) References Cited

U.S. PATENT DOCUMENTS 6,825,589 B2 * 11/2004 Kouda ..................... H02K 3/28
                                                                 310/201
7,268,455 B2 *  9/2007 Kouda ..................... H02K 3/28
                                                                 310/201
(Continued)

FOREIGN PATENT DOCUMENTS

JP      2004064914 A    2/2004
JP      5896250 B2      3/2016
(Continued)

OTHER PUBLICATIONS

English translation of Written Opinion issued in International Application No. PCT/JP2018/038842 dated Jan. 15, 2019, previously cited in IDS filed Jun. 26, 2020.
(Continued)

*Primary Examiner* — Quyen P Leung
*Assistant Examiner* — Minki Chang
(74) *Attorney, Agent, or Firm* — Rossi, Kimms & McDowell LLP

(57) ABSTRACT

Coil segments of the same phase are inserted into each group of circumferentially consecutive three slots. Assuming that the grouped three slots are A, B, and C, and six groups are U1 to U6, respectively, and that slot y of group Ux are slot Uxy, a coil starting from the slot U1A is wired to pass through one turn of a stator in the order of slots U1A→U2B→U3B→U4C→U5C→U6A, and connected to slot U1A of the next turn. In this turn, coil segments with a wide straddle width are used for the connections of U1A→U2B and U3B→U4C, and a coil segment with a narrow straddle width is used for the connection of U5C→U6A.

18 Claims, 12 Drawing Sheets

(58) Field of Classification Search
CPC ... H02K 15/062; H02K 15/063; H02K 15/064
See application file for complete search history.

(56) References Cited

U.S. PATENT DOCUMENTS

| | | | | |
|---|---|---|---|---|
| 2003/0230949 | A1* | 12/2003 | Ogawa | H02K 3/12 310/180 |
| 2015/0076953 | A1 | 3/2015 | Tamura | |
| 2016/0094101 | A1* | 3/2016 | Awazu | H02K 21/14 29/596 |
| 2016/0248290 | A1 | 8/2016 | Tamura | |
| 2017/0033619 | A1 | 2/2017 | Tamura | |
| 2020/0274425 | A1 | 8/2020 | Miyazaki | |
| 2020/0343794 | A1* | 10/2020 | Koga | H02K 15/064 |

FOREIGN PATENT DOCUMENTS

| | | |
|---|---|---|
| JP | 2016127639 A | 7/2016 |
| JP | 2016152751 A | 8/2016 |
| JP | 2017034847 A | 2/2017 |
| JP | 2017184558 A | 10/2017 |
| WO | 2019093515 A1 | 5/2019 |

OTHER PUBLICATIONS

International Preliminary Report on Patentability issued in Intl. Appln. No. PCT/JP2018/038842 dated Jul. 9, 2020. English translation provided.
Extended European Search Report issued in European Appln. No. 18895547.0 dated Mar. 1, 2021.
Office Action issued in Chinese Appln. No. 201880084665.1 dated Dec. 3, 2021. English translation provided.
International Search Report issued in International Application No. PCT/JP2018/038842 dated Jan. 15, 2019. English translation provided.
Written Opinion issued in International Application No. PCT/JP2018/038842 dated Jan. 15, 2019.

* cited by examiner

[Fig. 1]
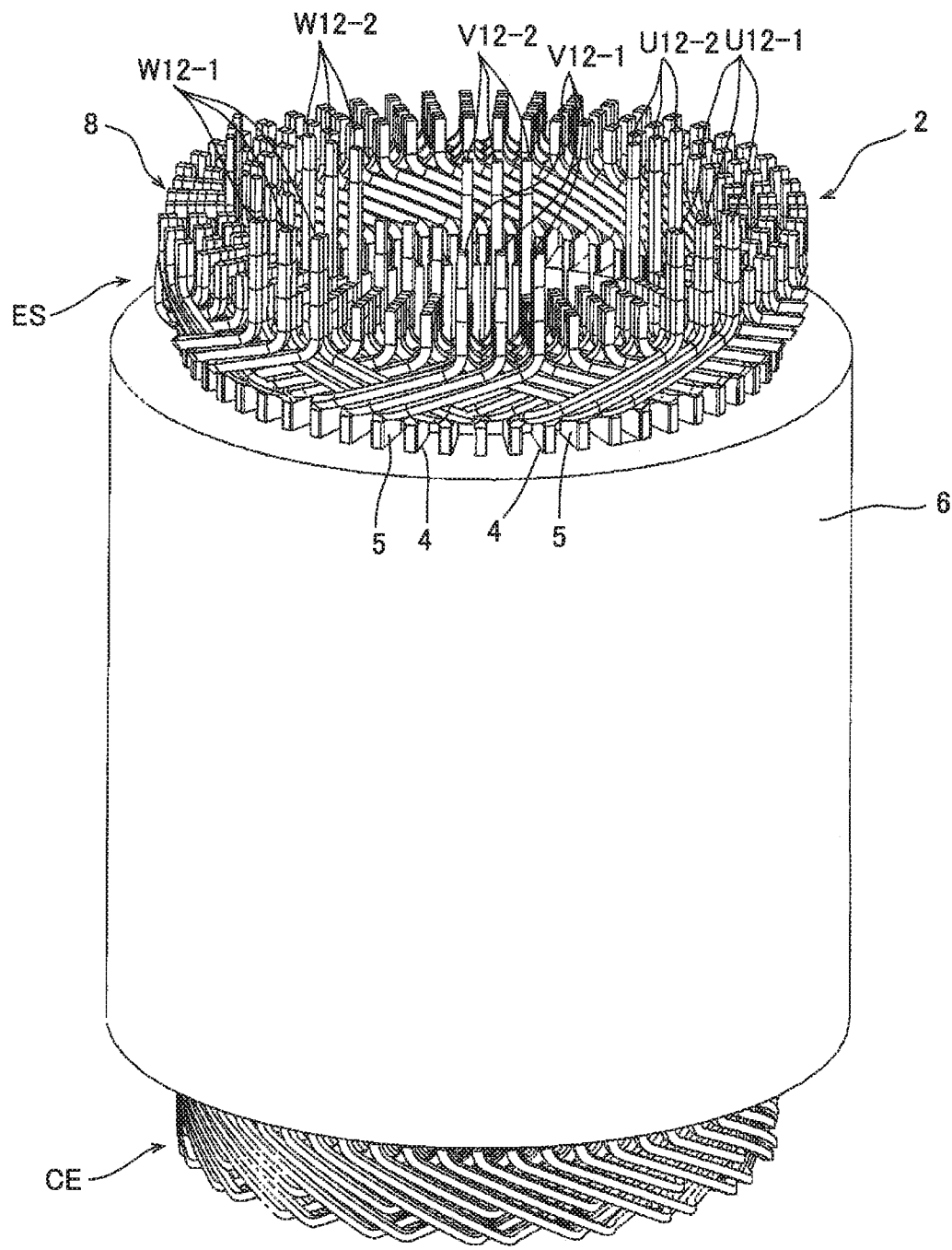

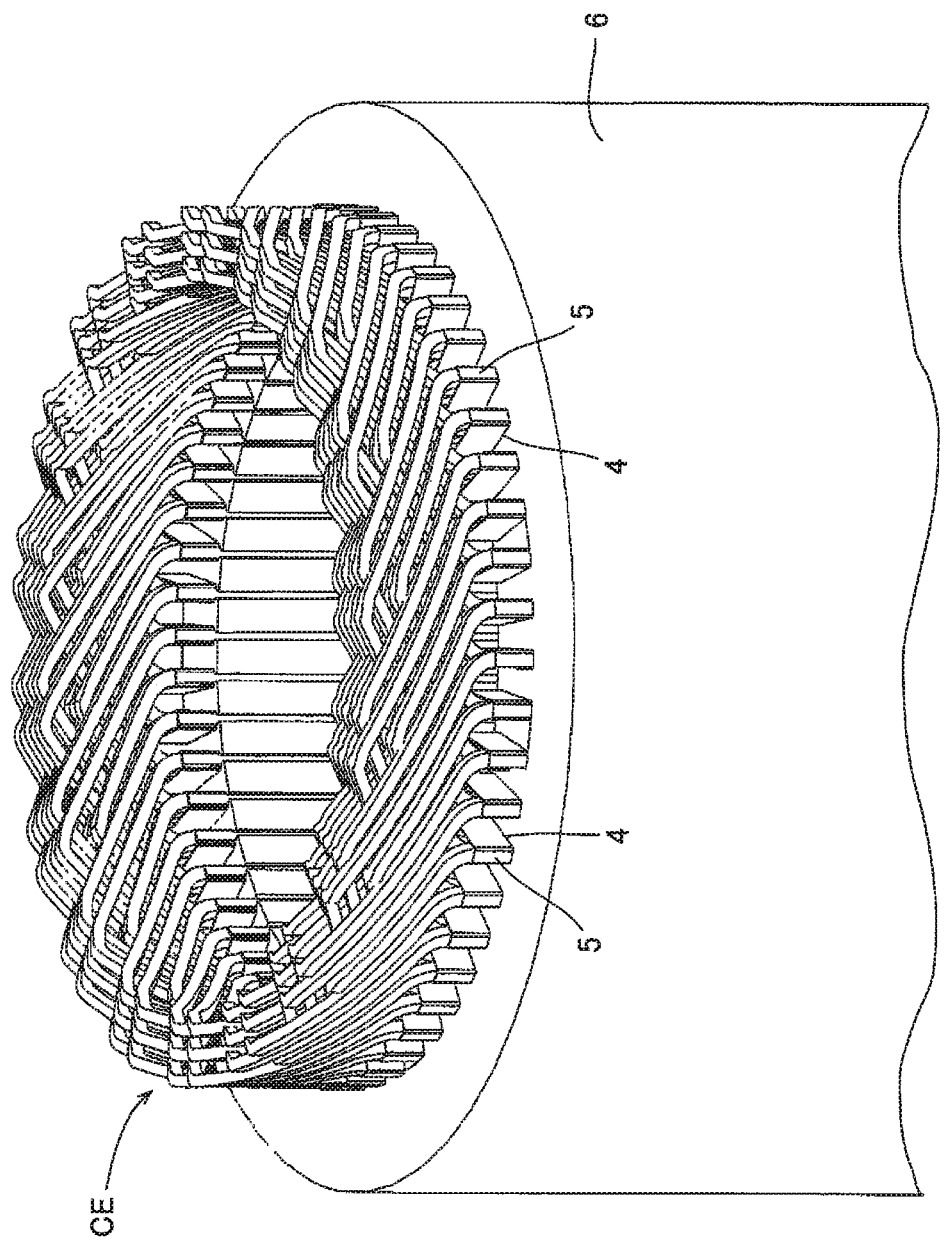
[Fig. 2]

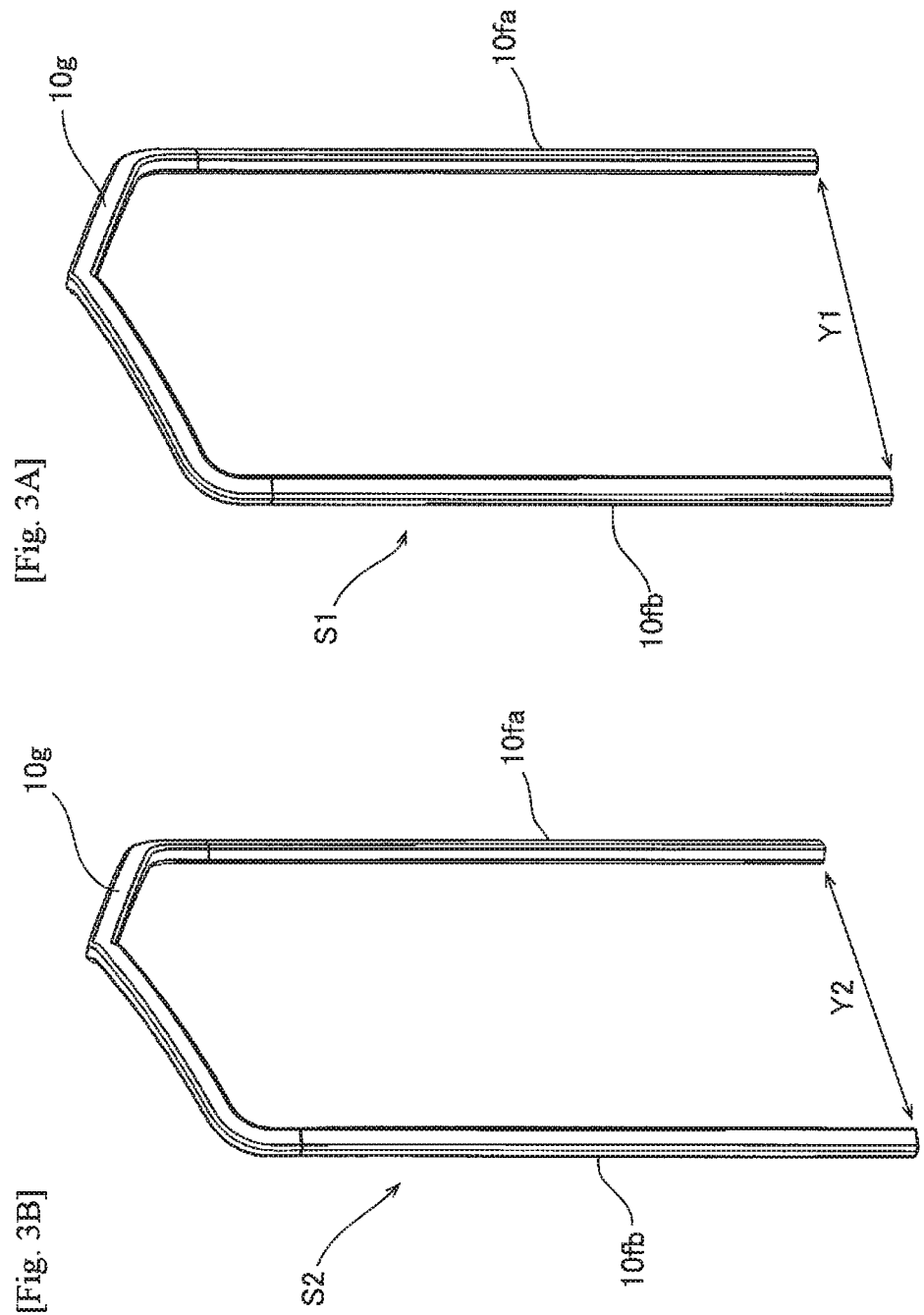

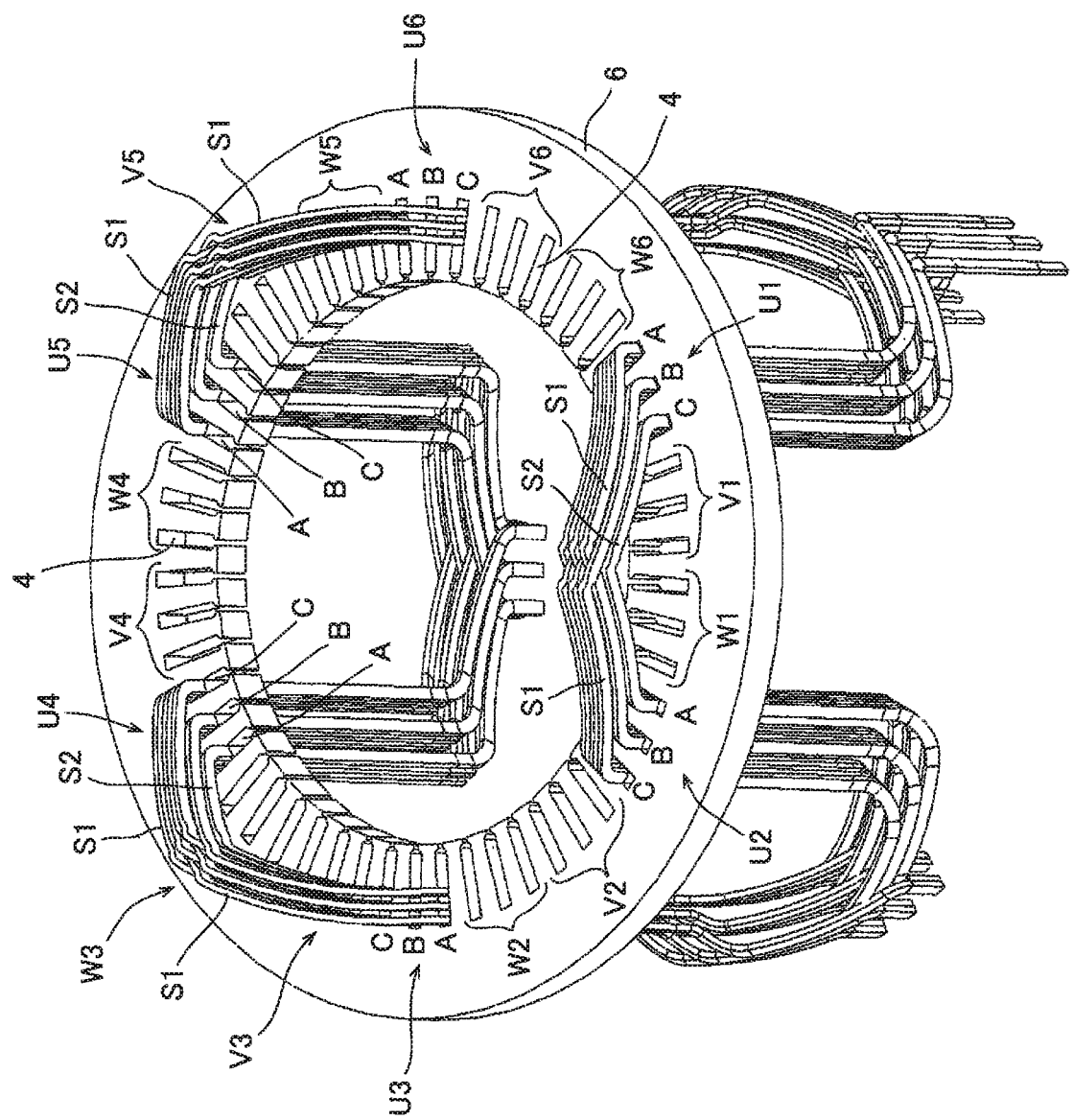
[Fig. 4]

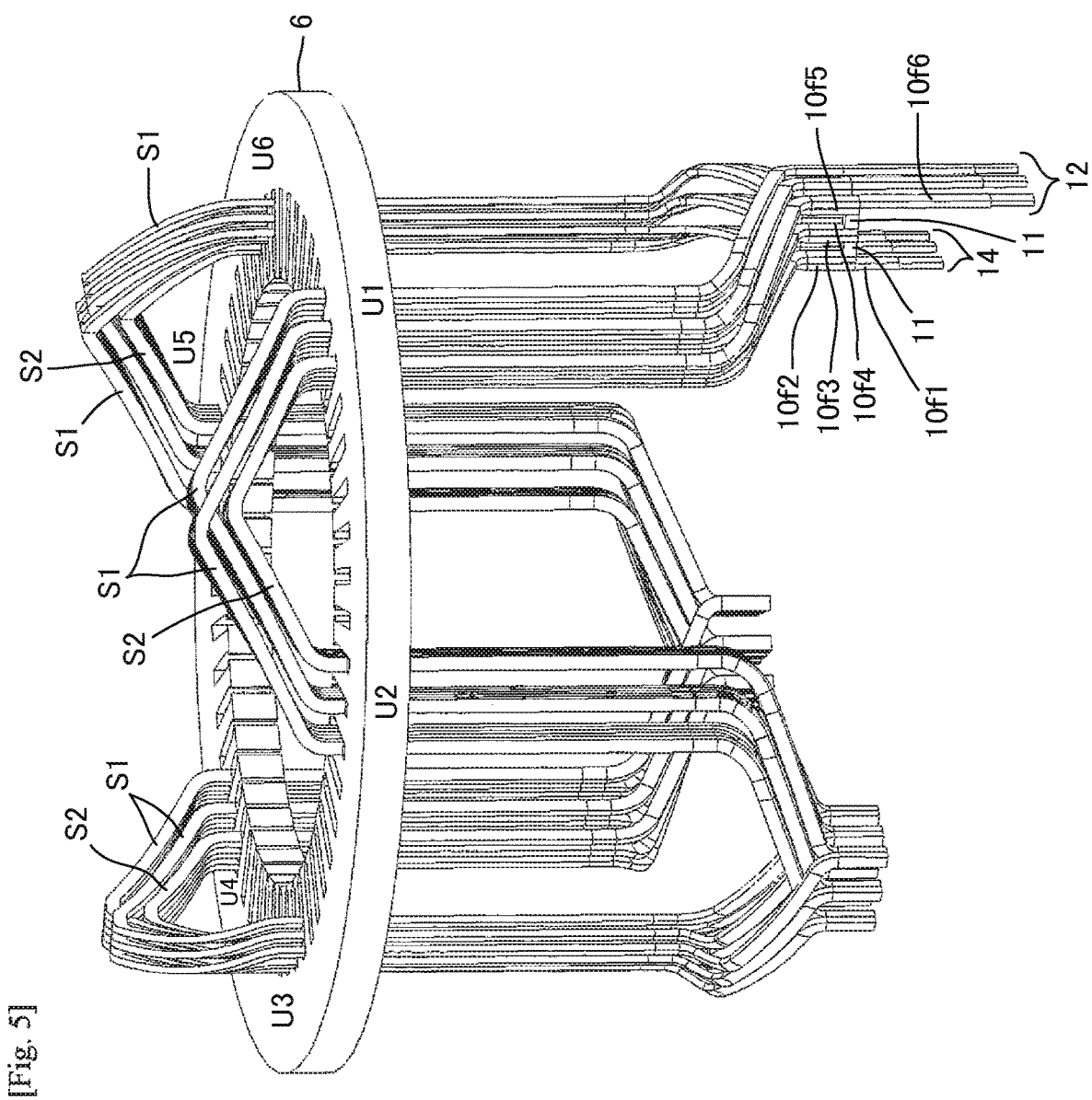
[Fig. 5]

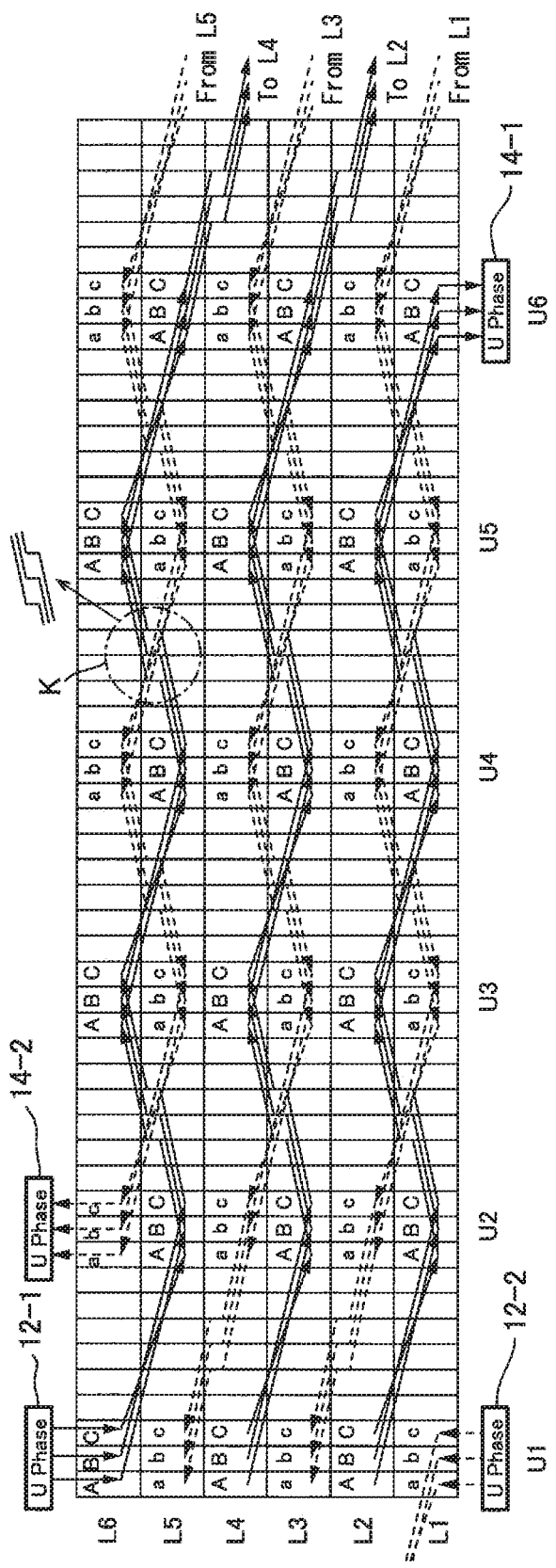

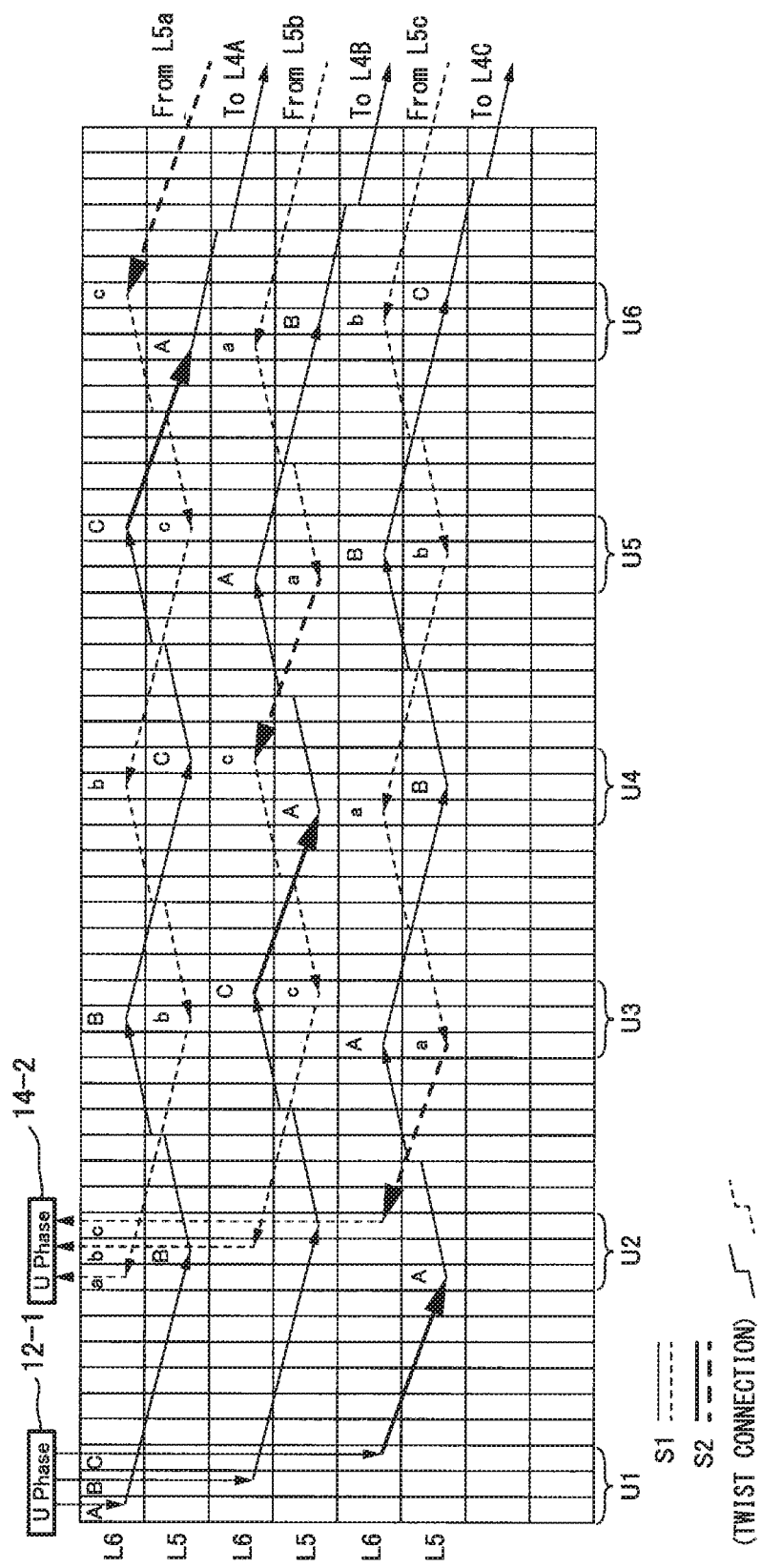

[Fig. 8]
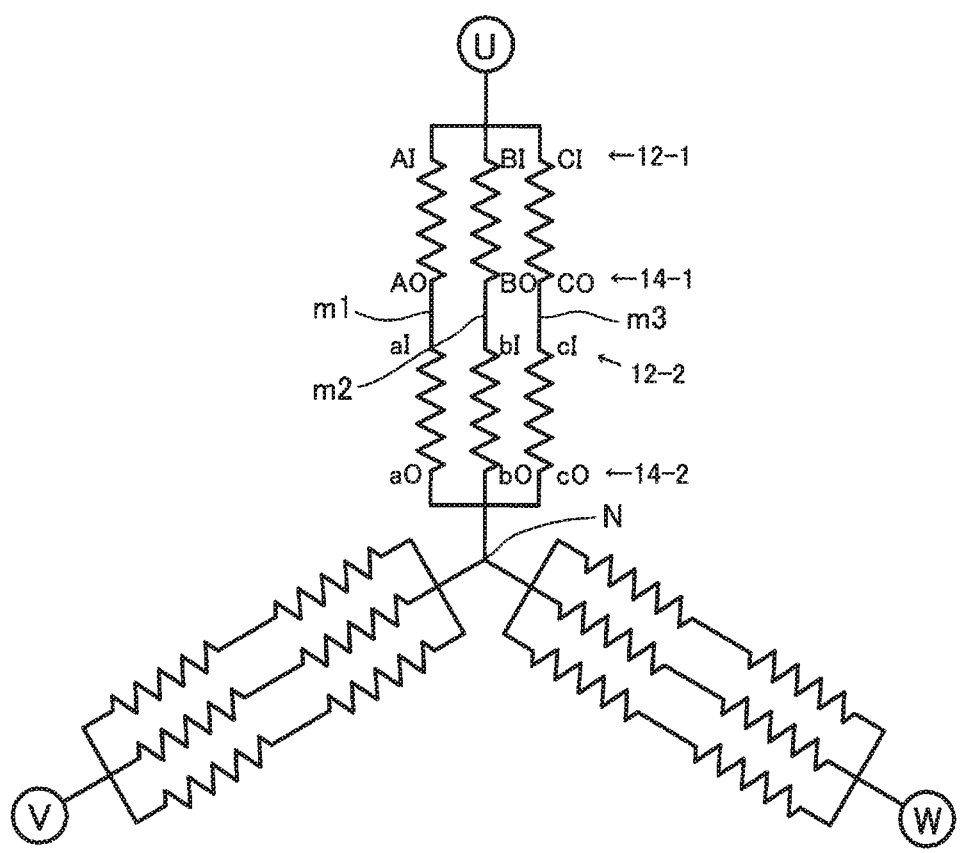

[Fig. 9]
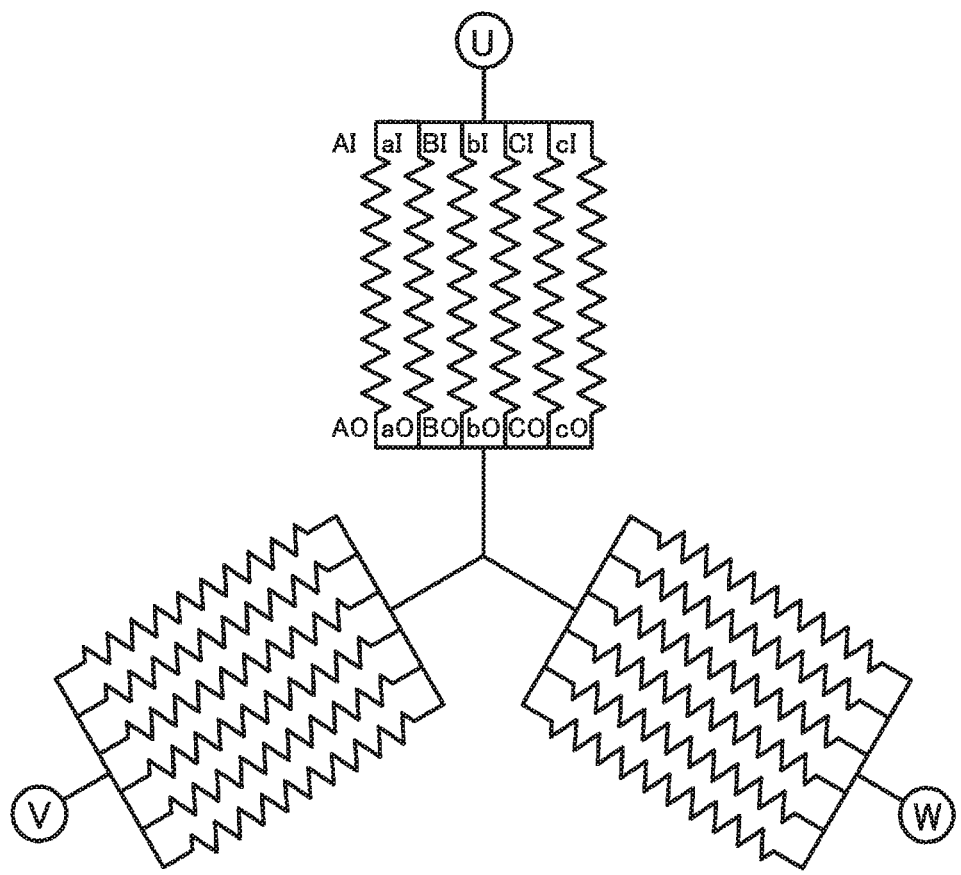

[Fig. 10]
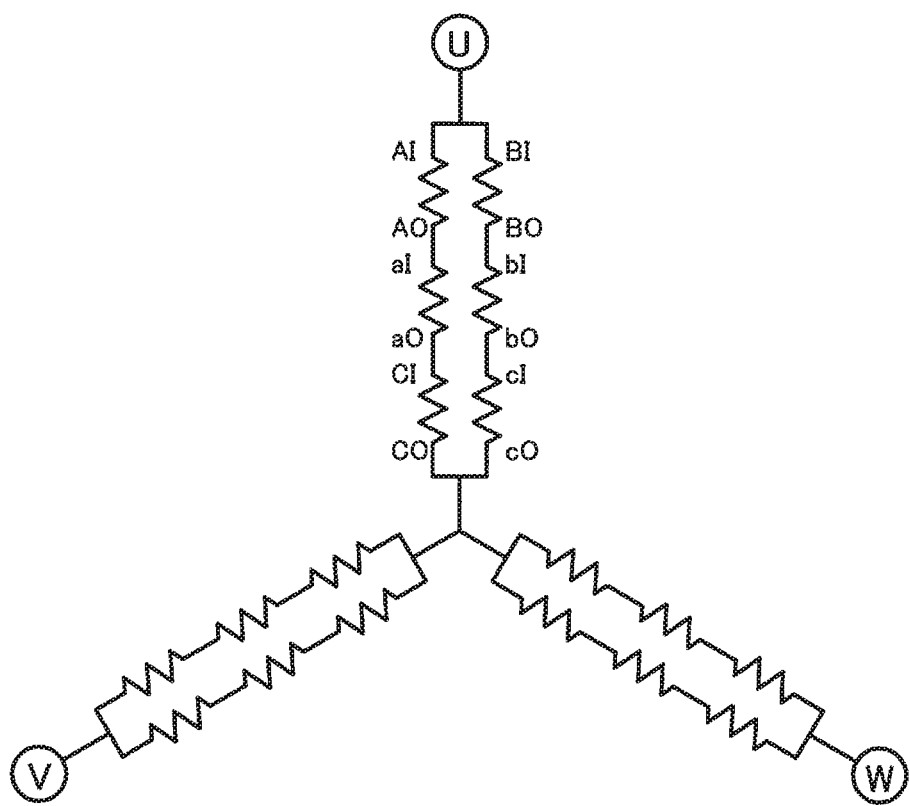

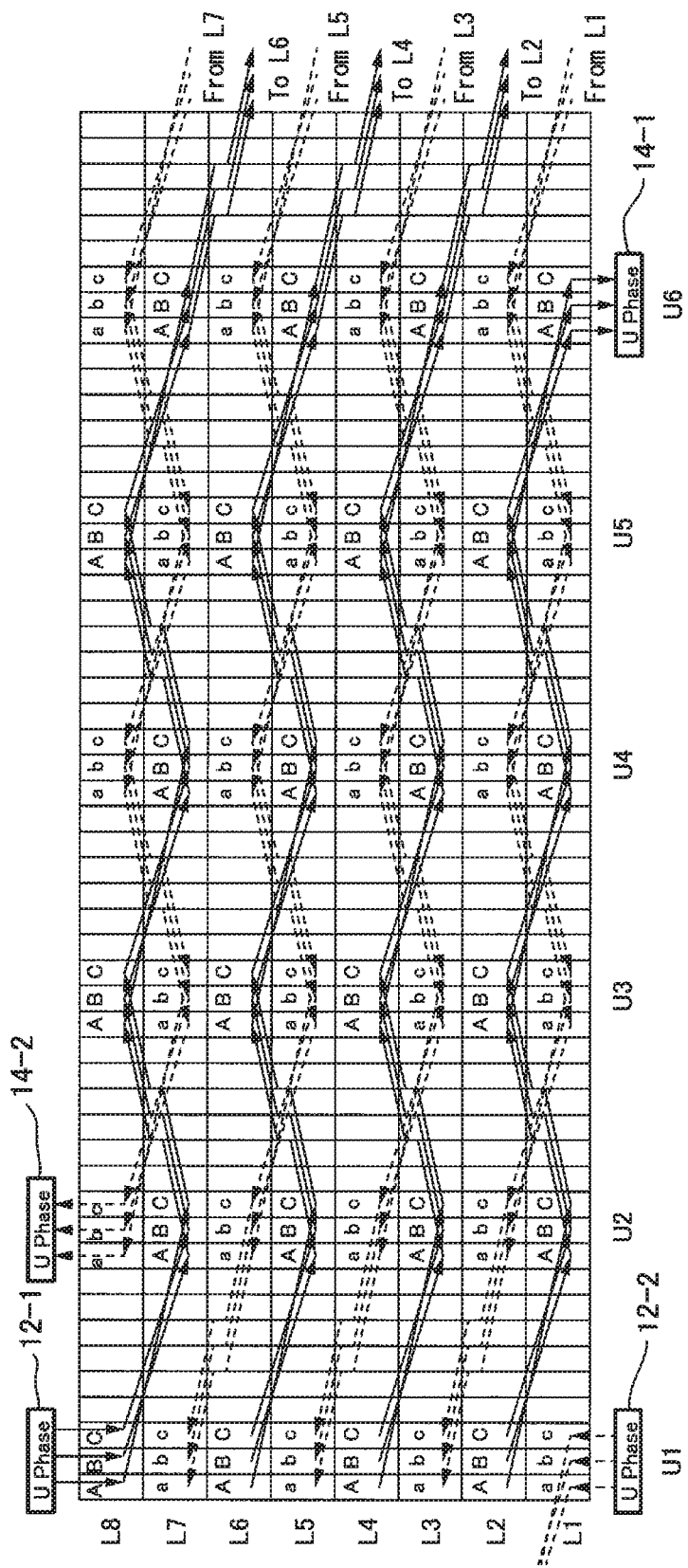
[Fig. 11]

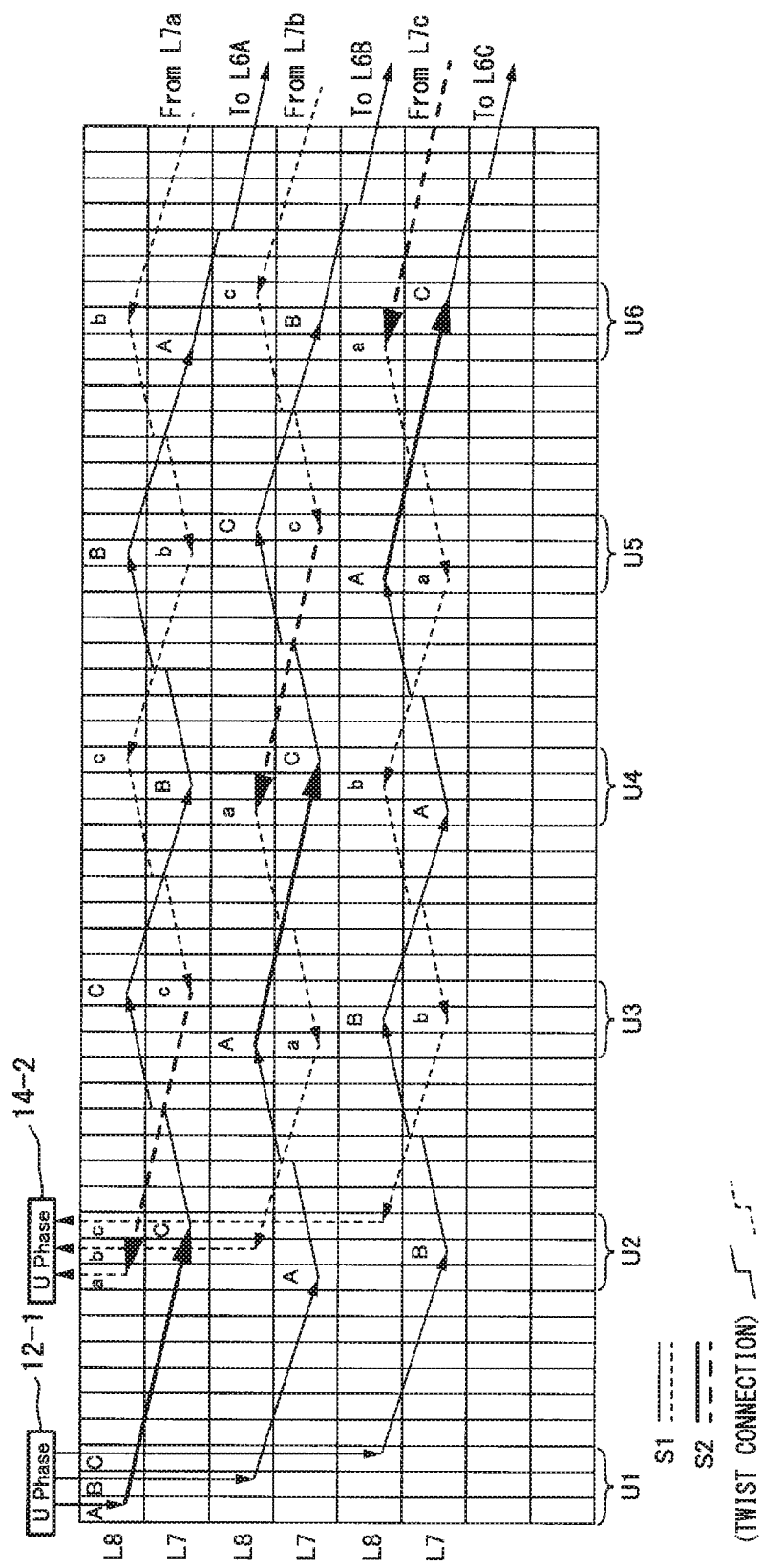

WIRE CONNECTION METHOD FOR ELECTRICAL ROTATING MACHINE, METHOD OF MANUFACTURING ELECTRICAL ROTATING MACHINE, WIRE CONNECTION STRUCTURE OF ELECTRICAL ROTATING MACHINE, AND ELECTRICAL ROTATING MACHINE

TECHNICAL FIELD

The present invention relates to a wire connection method and a wire connection structure for an electrical rotating machine (rotary electric machine) such as a motor or a generator, and more particularly, a wire connection method and a wire connection structure for a three-phase (U-phase, V-phase, W-phase) electrical rotating machine having a coil configured by coil segments in a U-shape or the like having a pair of slot insertion portions. The present invention also relates to a method of manufacturing an electrical rotating machine, and an electrical rotating machine.

BACKGROUND ART

As a coil of a stator or rotor of an electrical rotating machine, so-called segment type coil is well known, wherein coil segments respectively formed by processing a linear wire rod into a U-shape are inserted into a plurality of slots arranged along a circumferential direction of the stator or rotor, respectively, and free end sides of these coil segments are electrically connected with one another by welding or the like to form the coil.

This type of coil segment is also referred to as a hairpin.

In an electrical rotating machine having parallel circuits in which paths respectively formed by a plurality of coil segments are connected in parallel, if the number of the coil segments passing through the slots of each phase is not the same, the phase difference will not be canceled, and thus the parallel circuits will not have equivalence, resulting in a circulating current.

Most of the circulating current is a reactive current, which causes a reactive power loss (e.g., reduced output of the motor) and a copper loss.

PTL1 discloses a wire connection structure for suppressing the circulating current in the case where the number of slots formed in the stator core is forty-eight, the number of magnetic poles of the rotor is eight, the coils (U-shaped conductor segments) of each phase of the stator winding are housed in each circumferentially neighboring (consecutive) two slots, and each phase is formed by 4×n (n is a natural number) lines of parallel windings connected in parallel.

As described in paragraphs 0031 to 0041 and FIG. 8 of PTL1, this wire connection structure adopts, for the interpair connections between the pairs of slots A and B which are circumferentially neighboring two slots, conductor segments having a pitch of five slots and those having a pitch of seven slots for switching between the A and B, in addition to conductor segments having a pitch of six slots straddling with a normal width. In the wire connection structure, by switching slots to be the path in the middle of the turn of the winding by using the above conductor segments, the number of conductor segments arranged in the slots A and B of each pair is equalized.

That is, the number of the conductor segments (the number of insertions) arranged in the slots is equalized in each pair in each phase to balance the parallel windings, thereby suppressing occurrence of the circulating current.

CITATION LIST

Patent Literature

[PTL1] Japanese Patent No. 5896250

SUMMARY OF INVENTION

Technical Problem

Incidentally, there are various three-phase electrical rotating machines of this type with various combinations of number of slots and number of poles, depending on conditions of external dimensions, motor output, and the like. In some combination among them, the coils of each phase should be housed in each circumferentially consecutive three slots. For example, in the case of fifty-four slots and six poles, 54 slots/6 poles/3 phases=3 holds, and thus housing in each three slots should be applied.

On the other hand, PTL1 discloses a configuration for suppressing occurrence of the circulating current in the case where coil segments of same phase are inserted in each two circumferentially neighboring slots as in the configuration described in PTL1, but this configuration is not applicable to the case where coil segments of same phase are inserted in each three circumferentially consecutive slots.

The present invention has been developed in view of the above situation, and it is an object of the present invention to suppress a circulating current in the case of forming an electrical rotating machine in which coil segments of same phase are inserted in each three circumferentially consecutive slots.

Solution to Problem

In order to achieve the above object, a wire connection method for an electrical rotating machine according to the present invention is a wire connection method for an electrical rotating machine, the method being a method of forming a parallel circuit for three phases and connecting the parallel circuit for the three phases by a star connection, by inserting first and second slot insertion portions of each of coil segments into a plurality of circumferentially arranged slots and electrically connecting distal ends of the coil segments in their insertion direction according to a predetermined pattern, each of the coil segments comprising the first and second slot insertion portions that are a pair of slot insertion portions and a linking portion connecting the first and second slot insertion portions, the method comprising a first step of inserting the coil segments to form one phase among the three phases into a plurality of groups of circumferentially consecutive three slots among the plurality of slots, the groups being circumferentially arranged at equal intervals, so that a first slot insertion portion of a first coil segment is inserted into one slot of a certain group, and a second slot insertion portion of the first coil segment is inserted into a slot of a group adjacent to the certain group, the slot being adjacent to a slot corresponding to the one slot, and that a first slot insertion portion of a second coil segment is inserted into one slot at an end of another certain group, and a second slot insertion portion of the second coil segment is inserted into a slot at another end of a group adjacent to said another certain group, and that same number of coil segments are inserted in each of the three slots of each group.

In such a wire connection method for an electrical rotating machine, it is conceivable that the first step comprises a second step of forming a first coil segment group, as a part of the coil segments to form the one phase, with respect to a first slot, a second slot, and a third slot that are three slots aligning in one direction from one end to another end in each of the groups, and to a first group, a second group, a third group, a fourth group, and a fifth group, and a sixth group that are six groups disposed in the one direction in this order among the plurality of groups, by: inserting the first slot insertion portion of one said first coil segment into the first slot of the first group; inserting the second slot insertion portion of the one first coil segment into the second slot of the second group; inserting the first slot insertion portion of another said first coil segment into the second slot of the third group; inserting the second slot insertion portion of said another first coil segment into the third slot of the fourth group; inserting the first slot insertion portion of one said second coil segment into the third slot of the fifth group; inserting the second slot insertion portion of the one second coil segment into the first slot of the sixth group; electrically connecting the second slot insertion portion inserted into the second slot of the second group with the first slot insertion portion inserted into the second slot of the third group; and electrically connecting the second slot insertion portion inserted into the third slot of the fourth group with the first slot insertion portion inserted into the third slot of the fifth group.

Further, it is conceivable that the first step comprises a third step of, with respect to M that is a natural number, forming (M+1) pieces of the first coil segment groups, by inserting, for each natural number X from 1 to M, each slot insertion portion of each coil segment to form (X+1)-th first coil segment group into the slots so as to overlap with each slot insertion portion of each coil segment forming X-th first coil segment group, and electrically connecting the second slot insertion portion, of the X-th first coil segment group, inserted into the first slot of the sixth group and the first slot insertion portion, of the (X+1)-th first coil segment group, inserted into the first slot of the first group.

It is conceivable that the second step is a step of further forming a second coil segment group in which positions of each coil segment circumferentially differ from those in the first coil segment group by two groups of the slots, and a third coil segment group in which positions of each coil segment further circumferentially differ from those in the second coil segment group by two groups of the slots such that the three slots of each of the groups accept insertion of one slot insertion portion of the coil segment from each of the first to third coil segment groups.

It is conceivable that the second step is a step of further forming fourth to sixth coil segment groups in which positions of each coil segment circumferentially differ from those in the first to third coil segment groups by one group of the slots, respectively, such that the three slots of each of the groups accept insertion of one slot insertion portion of the coil segment from each of the first to sixth coil segment groups.

Further, it is conceivable that number of the slots is fifty-four and number of poles of the electrical rotating machine is six.

Further, it is conceivable that the first step is a step of respectively inserting the slot insertion portions of the first coil segment into two slots which are circumferentially ten slots distant from each other, and respectively inserting the slot insertion portions of the second coil segment into two slots which are circumferentially seven slots distant from each other.

Alternatively, it is conceivable that the first step is a step of respectively inserting the slot insertion portions of the first coil segment into two slots which are circumferentially eight slots distant from each other, and respectively inserting the slot insertion portions of the second coil segment into two slots which are circumferentially eleven slots distant from each other.

The present invention also provides a method of manufacturing an electrical rotating machine including a coil, wherein the coil is wired according to any of the above-mentioned wire connection method for the electrical rotating machine.

Further, a wire connection structure of an electrical rotating machine according to the present invention is a wire connection structure of an electrical rotating machine, the electrical rotating machine comprising: a plurality of circumferentially arranged slots; and coil segments respectively comprising first and second slot insertion portions that are a pair of slot insertion portions, and a linking portion connecting the first and second slot insertion portions, the first and second slot insertion portions being respectively inserted into the slots, wherein distal ends of the first and second slot insertion portions in their insertion direction are electrically connected according to a predetermined pattern to form parallel circuits for three phases, and the parallel circuits for three phases are connected by a star connection, wherein the coil segments to form one phase among the three phases are inserted into a plurality of groups of circumferentially consecutive three slots among the plurality of slots, the groups are circumferentially arranged at equal intervals, the plurality of coil segments includes a first coil segment and a second coil segment, a first slot insertion portion of the first coil segment is inserted into one slot of a certain group, a second slot insertion portion of the first coil segment is inserted into a slot of a group adjacent the certain group, the slot being adjacent to a slot corresponding to the one slot, a first slot insertion portion of the second coil segment is inserted into one slot at an end of another certain group, a second slot insertion portion of the second coil segment is inserted into a slot at another end of a group adjacent to said another certain group, and same number of coil segments are inserted in each of the three slots of each group.

In such a wire connection structure of an electrical rotating machine, it is conceivable that, with respect to a first slot, a second slot, and a third slot that are three slots aligning in one direction from one end to another end in each of the groups, and to a first group, a second group, a third group, a fourth group, and a fifth group, and a sixth group that are six groups disposed in the one direction in this order among the plurality of groups, the coil segments forming the one phase include a first coil segment group formed by one said first coil segment, another said first coil segment, and one said second coil segment, a first slot insertion portion of said one first coil segment is inserted into the first slot of the first group, a second slot insertion portion of said one first coil segment is inserted into the second slot of the second group, a first slot insertion portion of said another first coil segment is inserted into the second slot of the third group, a second slot insertion portion of said another first coil segment is inserted into the third slot of the fourth group, a first slot insertion portion of said one second coil segment is inserted into the third slot of the fifth group, a second slot insertion portion of said one second coil segment is inserted into the first slot of the sixth group, the second slot insertion portion inserted into the second slot of the second group and the first slot insertion portion inserted into the second slot of the third group are electrically connected with each other, and the second slot insertion portion inserted into the third slot of the fourth group and the first slot insertion portion inserted into the third slot of the fifth group are electrically connected with each other.

Further, it is conceivable, with respect to M that is a natural number, to comprise (M+1) pieces of the first coil segment groups, and conceivable that, for each natural number X from 1 to M, each slot insertion portion of each coil segment forming (X+1)-th first coil segment group is inserted into the slots so as to overlap with each slot insertion portion of each coil segment forming X-th first coil segment group, and the second slot insertion portion, of the X-th first coil segment group, inserted into the first slot of the sixth group and the first slot insertion portion, of the (X+1)-th first coil segment group, inserted into the first slot of the first group are electrically connected with each other.

Further, it is conceivable to comprise: a second coil segment group in which positions of each coil segment circumferentially differ from those in the first coil segment group by two groups of the slots; and a third coil segment group in which positions of each coil segment further circumferentially differ from those in the second coil segment group by two groups of the slots, and conceivable that the three slots of each of the groups accept insertion of one slot insertion portion of the coil segment from each of the first to third coil segment groups.

Further, it is conceivable to comprise fourth to sixth coil segment groups in which positions of each coil segment circumferentially differ from those in the first to third coil segment groups by one group of the slots, respectively, and conceivable that the three slots of each of the groups accept insertion of one slot insertion portion of the coil segment from each of the first to sixth coil segment groups.

Further, it is conceivable that number of the slots is fifty-four and number of poles of the electrical rotating machine is six.

Further, it is conceivable that the slot insertion portions of the first coil segment are respectively inserted into two slots which are circumferentially ten slots distant from each other, and the slot insertion portions of the second coil segment are respectively inserted into two slots which are circumferentially seven slots distant from each other.

Alternatively, it is conceivable that the slot insertion portions of the first coil segment are respectively inserted into two slots which are circumferentially eight slots distant from each other, and the slot insertion portions of the second coil segment are respectively inserted into two slots which are circumferentially eleven slots distant from each other.

The present invention also provides an electrical rotating machine including any of the above-mentioned wire connection structures.

Effect of the Invention

According to the present invention, in the case of forming an electrical rotating machine in which coil segments of same phase are inserted in each three circumferentially consecutive slots, a circulating current can be suppressed.

BRIEF DESCRIPTION OF DRAWINGS

FIG. 1 a perspective view of a stator of an electrical rotating machine according to a first embodiment of the present invention;

FIG. 2 is a perspective view of the coil end side of the stator shown in FIG. 1.

FIG. 3A is a perspective view showing a first coil segment among coil segments to form the coils of the stator shown in FIG. 1, in a state not twisted.

FIG. 3B is a figure corresponding to FIG. 3A showing the state of a second coil segment.

FIG. 4 is a perspective view showing a part of the U-phase coil of the stator shown in FIG. 1.

FIG. 5 is a perspective view of the configuration shown in FIG. 4 from another angle.

FIG. 6 is a diagram showing a connection state of U-phase coil segments of the stator shown in FIG. 1.

FIG. 7 is a diagram in which a part of FIG. 6 is taken out.

FIG. 8 is a connection diagram of an example of the parallel circuits of the stator shown in FIG. 1.

FIG. 9 is a connection diagram of another example of the parallel circuits of the stator shown in FIG. 1.

FIG. 10 is a connection diagram of still another example of the parallel circuits of the stator shown in FIG. 1.

FIG. 11 is a diagram showing a connection state of U-phase coil segments of the stator according a second embodiment.

FIG. 12 is a diagram in which a part of FIG. 11 is taken out.

DESCRIPTION OF EMBODIMENTS

Hereinafter embodiments of the present invention will be described with reference to the drawings.

First, a first embodiment will be described with reference to FIG. 1 to FIG. 10.

FIG. 1 and FIG. 2 shows a stator 2 having a wire connection structure of an electrical rotating machine according to the present embodiment. FIG. 1 shows the entire stator 2, and FIG. 2 shows the coil end CE side of the stator 2.

The stator 2 includes a cylindrical core 6 having a plurality of circumferentially arranged slots 4, and coils 8 for three phases (U-phase, V-phase, W-phase) formed by inserting U-shaped coil segments into the slots 4 and connecting distal ends thereof in their insertion direction according to a predetermined pattern. The coils 8 are in a six-layer configuration.

Each coil segment is inserted from the coil end CE side, and the distal end side thereof in its insertion direction, i.e. the distal end portions of the coil segments protruding to the input unit (power supply unit) ES side shown in FIG. 1 are twisted and electrically connected with one another by electrical welding or the like, to form parallel circuits. Reference numeral 5 in FIG. 1 indicates an insulating paper which is an insulating material for insulating between the core 6 and the coil segment.

The core 6 has a configuration in which thin annular electrical steel plates are laminated in the axial direction of the cylinder and integrated with one another. A plurality of protrusions (teeth) projecting toward the center are formed on the inner side of the core 6 at predetermined intervals in the circumferential direction, and the slots 4 are formed between the neighboring protrusions.

The number of the slots 4 in the present embodiment is fifty-four, and the number of poles (the number of magnetic poles) of the not shown rotor to be inserted into the stator 2 is six. The number of the slots per phase of the coil 8 for each magnetic pole is three.

That is, coil segments of same phase are inserted in each three circumferentially consecutive slots, the fifty-four slots 4 constitute eighteen groups of three slots, the groups are arranged circumferentially, and U-phase slots, V-phase slots, and W-phase slots are repeatedly arranged six times in this order on the circumference. Incidentally, "U-phase slots" are a group of slots for inserting the coil segments to form the U-phase coil, and the same applies to the V-phase and W-phase.

U12-1, 2, V12-1, 2, and W12-1, 2 are input portions for applying a voltage to the U-phase coil, V-phase coil, and W-phase coil, respectively, and the structure thereof will be described later.

A coil segment as a conductor is, as shown in FIG. 3A and FIG. 3B, formed by bending a flat wire whose surface is covered with an insulating film such as enamel into a U-shape, and the coil segment has a pair of slot insertion portions 10*fa* and 10*fb*, and a linking portion 10*g* connecting them. Both of the slot insertion portions 10*fa* and 10*fb* are linear and are portions to be inserted into the slots 4. The linking portion 10*g* has a bent shape (cranked shape) for layer transfer (lane change). In the examples of FIG. 3A and FIG. 3B, the slot insertion portion 10*fb* is located deeper than the slot insertion portion 10*fa* in the figure.

In the present embodiment, a first coil segment S1 whose slot insertion portions 10*fa*, 10*fb* are to be inserted into two slots which are circumferentially ten slots distant from each other, respectively, and a second coil segment S2 whose slot insertion portions 10*fa*, 10*fb* are to be inserted into two slots which are circumferentially seven slots distant from each other, respectively, are adopted.

FIG. 3A shows an example of the first coil segment S1, and FIG. 3B shows an example of the second coil segment S2. As shown in these figures, the distance (straddle width) Y1 between the slot insertion portions 10*fa* and 10*fb* of the first coil segment S1 is the length of ten slots, and the distance (straddle width) Y2 between the slot insertion portions 10*fa* and 10*fb* of the second coil segment S2 is the length of seven slots, narrower than Y1.

Note that the length of one slot differs slightly depending on the position in the radial direction at which the slot insertion portions 10*fa* and 10*fb* are to be inserted. Therefore, even in the same type of coil segments, the size differs depending on the insertion positions. In addition, as will be described later, among the coil segments, those for input and those for connection to a neutral point are variant coil segments having different lengths of the slot insertion portions from those of the other coil segments.

In the following description, when distinguishing the slot insertion portions 10*fa* and 10*fb* included in one coil segment from each other, one slot insertion portion 10*fa* will be referred to as a first slot insertion portion, and the other slot insertion portion 10*fb* will be referred to as a second slot insertion portion. If not distinguished, the reference sign 10*f* is used. However, which of the slot insertion portions 10*fa* and 10*fb* is called "first" and which is called "second" is not essential.

Next, with reference to FIG. 4 and FIG. 5, the arrangement of the coil segments of each phase for fifty-four slots 4 will be described.

For the sake of clarity, FIG. 4 and FIG. 5 show the arrangement of a half of the coil segments forming the U-phase (U Phase) coil. That is, the U-phase coil actually include three coils each of which is would on the stator 2 by three turns (in a three-layer structure) as shown in FIG. 4 and FIG. 5, and three more coils whose positions circumferentially differ from those of the above three coils by 60°. FIG. 4 shows only the former. Further, in order to make the arrangement of the coil segments easy to see, the core 6 is shown as a thin disk in FIG. 4 and FIG. 5. However, actually, the core 6 is long enough to cover the entire straight portions of the slot insertion portions 10*fa* and 10*fb* in the state of FIG. 4 and FIG. 5. Incidentally, the arrangements of the coil segments forming the V-phase coil and the W-phase coil are ones rotated clockwise (the direction as viewed from the upper side of FIG. 4: the same applies below unless otherwise specified) from the arrangement of the U-phase coil segments by three slots and six slots, respectively, and are substantially the same configuration as the U-phase coil segments.

As shown in FIG. 4, the stator 2 has a configuration of inserting coil segments of same phase into circumferentially consecutive three slots 4. These three slots 4 are defined as a group of slots, and the slots 4 in each group are denoted by A, B, and C in order in the clockwise direction. In this embodiment, A corresponds to a first slot, B corresponds to a second slot, and C corresponds to a third slot.

The first to sixth groups U1 to U6 of slots for inserting the U-phase coil segments thereinto are arranged at equal intervals in the circumferential direction. Accordingly, there are six slots of spacing between adjacent groups, and in these spaces, the first to six groups V1 to V6 of slots for inserting the V-phase coil segments thereinto and the first to six groups W1 to W6 of slots for inserting the W-phase coil segments thereinto are similarly disposed at equal intervals. Here, since we focus on the arrangement of the U-phase coil segments, we consider only the groups U1 to U6 of slots, and that the groups adjacent to U1 are U2 and U6.

On the other hand, each of the coil segments S1 and S2 is inserted to straddle between groups circumferentially adjacent to each other among the six groups for one phase. Then, the first coil segment S1 is inserted such that the first slot insertion portion 10*fa* thereof is inserted into one slot of a certain group, and the second slot insertion portion 10*fb* thereof is inserted into a slot of a group adjacent to the certain group, the slot being adjacent to a slot corresponding to the one slot. Specifically, the first coil segment S1 is inserted to straddle between the slot A of a certain group (for example, U1) and the slot B (next to the slot A) of the adjacent group (U2) on the clockwise side, or to straddle between the slot B of a certain group and the slot C (next to the slot B) of the adjacent group on the clockwise side. The second coil segment S2 is inserted such that the first slot insertion portion 10*fa* thereof is inserted into one slot at one end of a certain group, and the second slot insertion portion 10*fb* thereof is inserted into a slot at another end of a group adjacent to the certain group. Specifically, the second coil segment S2 is inserted to straddle between the slot C of a certain group and the slot A of the adjacent group on the clockwise side.

Further, the portion protruding from the stator 2 of the distal end portion of each slot insertion portion 10*f* of each coil segment S1, S2 is twisted in the circumferential direction, and is electrically connected to the distal end portion of the adjacent coil segment twisted in the opposite direction (here, such connection is also referred to as "twist connection"). The "adjacent" here means that the slot insertion portion 10*f* is in the same turn and inserted into the corresponding slot of the adjacent group.

Hereinafter, the pattern of electrical connection between the coil segments will be described more specifically. In order to refer to a specific coil segment, the reference signs S1, S2 of the coil segments are used with subscripts of a combination of the group names (U1 to U6) and the slot names (A to C) of the slots into which the slot insertion portions 10*f* of the specific coil segment are inserted. For example, a first coil segment S1 with its first slot insertion portion 10fa inserted into the slot A of the group U3 and its second slot insertion portion 10fb inserted into the slot B of the group U4, straddling between these slots, is indicated as a coil segment $S1_{U3A-U4B}$. When it is necessary to specify which of the turns in the coil the coil segment forms, this point will be separately described. Similarly, the slots are named using the group name and the slot name in the group such that the slot A of the group U1 is the slot U1A.

First, one turn of a coil starting from the slot U1C is formed of three coil segments: a second coil segment $S2_{U1C-U2A}$; a first coil segment $S1_{U3A-U4B}$; and a first coil segment $S1_{U5B-U6C}$.

The distal end portion of the second slot insertion portion 10fb of the second coil segment $S2_{U1C-U2A}$ inserted into the slot U2A is twist-connected to the distal end portion of the first slot insertion portion 10fa of the first coil segment $S1_{U3A-U4B}$ inserted into the slot U3A. The distal end portion of the second slot insertion portion 10fb of the first coil segment $S1_{U3A-U4B}$ inserted into the slot U4B is twist-connected to the distal end portion of the first slot insertion portion 10fa of the first coil segment $S1_{U5B-U6C}$ inserted into the slot U5B.

However, the distal end portion of the second slot insertion portion 10fb of the first coil segment $S1_{U5B-U6C}$ inserted into the slot U6C faces the distal end portion of the first slot insertion portion 10fa of the second coil segment $S2_{U1C-U2A}$ of the same turn inserted into the slot U1C, but is not electrically connected thereto.

The path of the above one turn of the coil is a series path of U1C→U2A→U3A→U4B→U5B→U6C, and the coil segments pass through the slots located at positions of A, B, and C in the groups twice each.

Incidentally, a configuration for inputting electricity and a configuration for connecting to a neutral point are provided between U6 and U1, and as will be described later, the configuration of the electrical connection there is different from the connection between other groups.

The U-phase coil shown in FIG. 4 includes, in addition to the coil starting from the slot U1C, a coil starting from the slot U1A and a coil starting from the slot U1B.

One turn of the coil starting from the slot U1A is formed of three coil segments: a first coil segment $S1_{U1A-U2B}$; a first coil segment $S1_{U3B-U4C}$; and a second coil segment $S2_{U5C-U6A}$.

The distal end portion of the second slot insertion portion 10fb of the first coil segment $S1_{U1A-U2B}$ inserted into the slot U2B is twist-connected to the distal end portion of the first slot insertion portion 10fa of the first coil segment $S1_{U3B-U4C}$ inserted into the slot U3B. The distal end portion of the second slot insertion portion 10fb of the first coil segment $S1_{U3B-U4C}$ inserted into the slot U4C is twist-connected to the distal end portion of the first slot insertion portion 10fa of the second coil segment $S2_{U5C-U6A}$ inserted into the slot U5C.

The distal end portion of the second slot insertion portion 10fb of the second coil segment $S2_{U5C-U6A}$ inserted into the slot U6A faces the distal end portion of the first slot insertion portion 10fa of the first coil segment $S1_{U1A-U2B}$ inserted into the slot U1A, but is not electrically connected thereto.

The path of the above one turn of the coil is a series path of U1A→U2B→U3B→U4C→U5C→U6A, and the coil segments pass through the slots located at positions of A, B, and C in the groups twice each, as in the case of the path starting from U1C.

Further, one turn of the coil starting from the slot U1B is formed of three coil segments: a first coil segment $S1_{U1B-U2C}$; a second coil segment $S2_{U3C-U4A}$; and a first coil segment $S1_{U5A-U6B}$.

The distal end portion of the second slot insertion portion 10fb of the first coil segment $S1_{U1B-U2C}$ inserted into the slot U2C is twist-connected to the distal end portion of the first slot insertion portion 10fa of the second coil segment $S2_{U3C-U4A}$ inserted into the slot U3C. The distal end portion of the second slot insertion portion 10fb of the second coil segment $S2_{U3C-U4A}$ inserted into the slot U4A is twist-connected to the distal end portion of the first slot insertion portion 10fa of the first coil segment $S1_{U5A-U6B}$ inserted into the slot U5A.

The distal end portion of the second slot insertion portion 10fb of the first coil segment $S1_{U5A-U6B}$ inserted into the slot U6B faces the distal end portion of the first slot insertion portion 10fa of the first coil segment $S1_{U1B-U2C}$ inserted into the slot U1B, but is not electrically connected thereto.

The path of the above one turn of the coil is a series path of U1B→U2C→U3C→U4A→U5A→U6B, and the coil segments pass through the slots located at positions of A, B, and C in the groups twice each, as in the case of the path starting from U1C.

Each one turn among the three turns of the U-phase coil is described above, and the U-phase coil have the same connection path also for the remaining two turns. Each slot insertion portion 10f of the coil segments forming each turn is inserted into the slot 4 to form layers stacked in the radial direction. In addition, the three coils each forming three turns are formed of a total of 3×3×3=27 coil segments, provided with fifty-four slot insertion portions 10f. These slot insertion portions 10f are inserted into 3 slots×6 groups=18 slots, three times each to form three layers.

In addition to that, also in the above-described three more pieces of the three-turn coils whose positions circumferentially differ by 60° from those of the coils shown in FIG. 4, fifty-four slot insertion portions 10f are inserted into eighteen slots, three times each to form three layers. Therefore, in the entire U-phase coil, the slot insertion portions 10f inserted into each slot form six layers.

Next, structure of interturn electrical connections in the coil will be described with reference to FIG. 5.

In FIG. 5, reference signs 10/1 to 10/6 denote distal end portions of the slot insertion portions involved in the interturn electrical connections in the coil starting from the slot U1C.

Among them, 10/6 is a distal end portion of the first slot insertion portion 10fa inserted into the slot U1C, of the second coil segment $S2_{U1C-U2A}$ in the outermost turn of the coil. 10/5 is a distal end portion of the second slot insertion portion 10fb inserted into the slot U6C, of the first coil segment $S1_{U5B-U6C}$ in the outermost turn of the coil. These distal end portions 10/6 and 10/5 are, as described above, twisted in opposite directions along the circumferential direction (10/6 is counterclockwise, 10/5 is clockwise) respectively, and they are at positions facing each other, but not electrically connected with each other.

On the other hand, 10/4 is a distal end portion of the first slot insertion portion 10fa inserted into the slot U1C, of the second coil segment $S2_{U1C-U2A}$ in the second-outermost turn of the coil. The distal end portion 10/4 is twisted by the same distance in the same direction along the circumferential direction as the distal end portion 10/6. Accordingly, the distal end portion 10/4 also faces the distal end portion 10/5 on the side opposite to the distal end portion 10/6. Then, the distal end portion 10/4 and the distal end portion 10/5 are electrically connected with each other via a conductor 11, thereby the outermost turn of the coil and the second-outermost turn of the coil are electrically connected with each other in series.

Similarly, 10/3 is a distal end portion of the second slot insertion portion 10fb inserted into the slot U6C, of the first coil segment $S1_{U5B\text{-}U6C}$ in the second-outermost turn of the coil, which faces the distal end portion 10/4 but is not electrically connected thereto. 10/2 is a distal end portion of the first slot insertion portion 10fa inserted into the slot U1C, of the second coil segment $S2_{U1C\text{-}U2A}$ in the third-outermost turn (the innermost turn here) of the coil, which is electrically connected with the distal end portion 10/3 via the conductor 11. 10/1 is a distal end portion of the second slot insertion portion 10fb inserted into the slot U6C, of the first coil segment $S1_{U5B\text{-}U6C}$ in the third-outermost turn of the coil, which faces the distal end portion 10/2 but is not electrically connected thereto.

A coil in which the coil segments for the three-turns are connected in series can be formed through the above connections. The same connections are made to form the coil starting from the slot U1A and the coil starting from the slot U1B, respectively.

Incidentally, the distal end portion 10/6 forms the input portion 12 for connecting the coil to the external circuit and applying a voltage to the coil, and thus the distal end portion 10/6 is longer than the other distal end portions. Therefore, as a coil segment including the distal end portion 10/6, a variant coil segment having a slot insertion portion longer than that of the other coil segments is adopted.

Further, the distal end portion 10/1 forms a neutral point connecting portion 14 for connecting to the electrical neutral point of the three-phase coil in the star connection, and thus the distal end portion 10/1 is, although shorter than the distal end portion 10/6, longer than the other distal end portions. Therefore, also as a coil segment including the distal end portion 10/1, a variant coil segment having a slot insertion portion longer than that of other coil segments is adopted. Incidentally, as will be described later with reference to FIG. 8 to FIG. 10, the neutral point connecting portion 14 can also be used as a connecting portion for connecting the three-turn coils with one another in series or in parallel.

Next, with reference to FIG. 6 and FIG. 7, the arrangement and connection structure of the coil segments forming six pieces of three-turn coils which form the U-phase coil. FIG. 6 is a diagram obtained by developing the connection paths of the U-phase coil.

In FIG. 6, one row of rectangular cells arranged in the vertical direction indicates one slot. L1 to L6 respectively indicate the arrangement positions of the slot insertion portions 10f inserted in the slot to be stacked in the radial direction of the stator 2. L6 indicates the outermost position, and L1 indicates the innermost position. As described above, in this example, the slot insertion portions 10f form six layers. The position of the n-th layer among them is denoted by Ln (n is an integer of 1 to 6).

Further, the solid arrow in FIG. 6 shows the arrangement of the coil segments forming the three coils shown in FIG. 4. The dashed arrows show the arrangement of the coil segments forming the three coils whose positions circumferentially differ from those of the above three coils by 60°. Although arrows are used in order to make the arrangement of the coil segments easy to see, the coils themselves have no orientations (although the shapes of the electrodes differ between the input portion 12 and the neutral point connecting portion 14 in this embodiment, the difference is not essential, and the structures and functions thereof are not limited to those). Here, the linear arrows indicate the electrical connections between the slots via the linking portions 10g of the coil segments (on the side of the coil end CE in FIG. 1), and the cranked arrows indicated by the reference sign K indicate the electrical connections between the slots by the twist connection between the distal ends of the slot insertion portions 10f (on the side of the input portion ES in FIG. 1). Therefore, from a crank portion of an arrow to another crank portion at two arrows ahead can be considered to indicate an arrangement of one coil segment.

The alphabet letters A, B, and C respectively indicate slots in the groups of U1 to U6 which are denoted by A, B, and C in FIG. 4, and the upper case letters and the lower case letters are used differently from each other to distinguish between positions of the coils shown by the solid lines and positions of the coils shown by the dashed lines. In the description of FIG. 6, the slot A of the group U1 is referred to as the slot U1A as in the case of FIG. 4, but when the arrangement position of the coil shown by the dashed line is described, the slot is referred to as U1a using a lower case alphabet.

Further, regarding the input portions 12 and the neutral point connecting portions 14, the suffix "1" is added to indicate those comprised in the coils shown by the solid lines, whereas the suffix "2" is added to those comprised in the coils shown by the dashed lines to distinguish between them (similarly to FIG. 1).

FIG. 7 is a view showing the connection structure of only the sixth and fifth layers taken out from FIG. 6 and separated for each coil. In FIG. 7, the linking portions 10g of the second coil segments S2 are shown by a thick line so as to be easily distinguished from the first coil segments S1.

The arrangement and connection structure of the U-phase coil is described referring to FIG. 6.

First, in the coil starting from the slot U1A among the coils shown by the solid lines, the first slot insertion portion 10fa of the first coil segment $S1_{U1A\text{-}U52B}$ forming the outermost turn of the coil is inserted into the slot U1A at the position of the sixth layer to form the input portion 12-1. The second slot insertion portion 10fb thereof is inserted into the slot U2B at the position of the fifth layer, and the coil passes through the slot U2B.

Each coil segment is inserted in this way, wherein the first slot insertion portion 10fa is inserted at the position of the (m+1)-th layer, and the second slot insertion portion 10fb is inserted at the position of the m-th layer (in =1, 3, 5). Looking at each slot, a slot insertion portion forming a coil shown by a solid line is disposed in one of the m-th layer and the (m+1)-th layer, and a slot insertion portion forming a coil shown by a dashed line is disposed in the other. Thus, the coils shown by the solid lines and the coils shown by the dashed lines, whose arrangement positions differ by 60°, can be alternately disposed, thereby enabling an arrangement of the coils at a high density as a whole.

Then, the coil which passes through the slot U2B proceeds to the slot U3B through a twist connection with the adjacent first coil segment $S1_{U3B\text{-}U4C}$. The first slot insertion portion 10fa of the first coil segment $S1_{U3B\text{-}U4C}$ is inserted into the slot U3B at the position of the sixth layer, which is the layer adjacent to the second slot insertion portion 10fb of the first coil segment $S1_{U1A\text{-}U2B}$ (the fifth layer). Thus, these slot insertion portions can be positioned to face each other in the radial direction by merely twisting them in the circumferential direction, and can be electrically connected with each other easily by welding or the like.

The coil which passes through the sixth layer of the slot U3B likewise passes through the fifth layer of the slot U4C, and proceeds to the sixth layer of the slot U5C and the fifth layer of the slot U6A through a twist connection with the adjacent narrower second coil segment $S2_{U5C\text{-}U6A}$. The second coil segment $S2_{U5C\text{-}U6A}$ is disposed such that the linking portion 10g straddles the linking portion 10g of the first coil segment $S1_{U5A\text{-}U6B}$ forming the coil starting from the slot U1B and the linking portion 10g of the first coil segment $S1_{U5B\text{-}U6C}$ forming the coil starting from the slot U1C.

The coil which passes through the fifth layer of the slot U6A is electrically connected to the first slot insertion portion 10fa of the first coil segment $S1_{U1A\text{-}U2B}$ forming the second-outermost turn of the coil, inserted into the slot U1A at the position of the fourth layer, through an interturn connection described with reference to FIG. 5.

The above is a first coil segment group forming one turn of the coil, and by repeating this for three turns, the coil reaches the first layer of the slot U6A, and the second slot insertion portion 10fb of the coil segment $S2_{U5C\text{-}U6A}$ forming the innermost turn of the coil is inserted into the slot U6A at the position of the first layer to form the neutral point connecting portion 14-1.

Further, in the coil starting from the slot U1B, the first slot insertion portion 10fa of the first coil segment $S1_{U1B\text{-}U2C}$ inserted into the slot U1B at the position of the sixth layer forms the input portion 12-1. Then, the coil passes through the fifth layer of the slot U2C by the first coil segment $S1_{U1B\text{-}U2C}$, and proceeds to the sixth layer of the slot U3C and the fifth layer of the slot U4A through a twist connection with the adjacent narrower second coil segment $S2_{U3C\text{-}U4A}$. Next, the coil further proceeds to the sixth layer of the slot U5A and the fifth layer of the slot U6B through a twist connection with the adjacent first coil segment $S1_{U5A\text{-}U6B}$, and is electrically connected to the first slot insertion portion 10fa of the first coil segment $S1_{U1B\text{-}U2C}$ forming the second-outermost turn of the coil, inserted into the slot U1B at the position of the fourth layer, through an interturn connection.

The above is a second coil segment group forming one turn of the coil, and by repeating this for three turns, the coil reaches the first layer of the slot U6B, and the second slot insertion portion 10fb of the first coil segment $S1_{U5A\text{-}U6B}$ forming the innermost turn of the coil is inserted into the slot U6B at the position of the first layer to form the neutral point connecting portion 14-1.

Further, in the coil starting from the slot U1C, the first slot insertion portion 10fa of the narrower second coil segment $S2_{U1C\text{-}U2A}$ inserted into the slot U1C at the position of the sixth layer forms the input portion 12-1. Then, the coil passes through the fifth layer of the slot U2A by the second coil segment $S2_{U1C\text{-}U2A}$, and proceeds to the sixth layer of the slot U3A and the fifth layer of the slot U4B through a twist connection with the adjacent first coil segment $S1_{U3A\text{-}U4B}$. Next, the coil further proceeds to the sixth layer of the slot U5B and the fifth layer of the slot U6C through a twist connection with the adjacent first coil segment $S1_{U5B\text{-}U6C}$, and is electrically connected to the first slot insertion portion 10fa of the second coil segment $S2_{U1C\text{-}U2A}$ forming the second-outermost turn of the coil, inserted into the slot U1C at the position of the fourth layer, through an the interturn connection.

The above is a third coil segment group forming one turn of the coil, and by repeating this for three turns, the coil reaches the first layer of the slot U6C, and the second slot insertion portion 10fb of the first coil segment $S1_{U5A\text{-}U6B}$ forming the innermost turn of the coil is inserted into the slot U6C at the position of the first layer to form the neutral point connecting portion 14-1.

Next, the coils shown by the dashed lines will be described. Since the first layer side of the coils shown by the dashed lines form input portions 12-2 thereof, the description will be started from the first layer side. However, a voltage can be applied to the coils in whichever direction in accordance with connections with the external circuit, as described above.

First, in the coil starting from the slot U1a, the second slot insertion portion 10fb of the narrower second coil segment $S2_{U1a\text{-}U6c}$ inserted into the slot U1a at the position of the first layer forms the input portion 12-2. Then, the coil passes through the second layer of the slot U6c by the second coil segment $S2_{U1a\text{-}U6c}$, and proceeds to the first layer of the slot U5c and the second layer of the slot U4b through a twist connection with the adjacent first coil segment $S1_{U5c\text{-}U4b}$. Next, the coil further proceeds to the first layer of the slot U3b and the second layer of the slot U2a through a twist connection with the adjacent first coil segment $S1_{U3b\text{-}U2a}$, and is electrically connected to the second slot insertion portion 10fb of the second coil segment $S2_{U1a\text{-}U6c}$ forming the second-innermost turn of the coil, inserted into the slot U1a at the position of the third layer, through an interturn connection as in the case of the coils shown by the solid lines.

The above is a fourth coil segment group forming one turn of the coil, and by repeating this for three turns, the coil reaches the sixth layer of the slot U2a, and the first slot insertion portion 10fa of the first coil segment $S1_{U3b\text{-}U2a}$ forming the outermost turn of the coil is inserted into the slot U2a at the position of the sixth layer to form the neutral point connecting portion 14-2. Incidentally, it is common to the coils shown by the dashed lines and the coils shown by the solid lines that, among the two slot insertion portions 10f, one disposed on the right side (the side proceeding counterclockwise in FIG. 4) and the inner peripheral side in FIG. 6 is the second slot insertion portion 10fb, and the other is the first slot insertion portion 10fa.

Similarly, in the coil starting from the slot U1b, the second slot insertion portion 10fb of the innermost first coil segment $S1_{U1b\text{-}U6a}$ inserted into the slot U1b at the position of the first layer forms the input portion 12-2, and the coil proceeds to the second layer of the slot U6a, the first layer of the slot U5a, the second layer of the slot U4c, the first layer of the slot U3c, and the second layer of the slot U2b. Then, the coil is electrically connected to the second slot insertion portion 10fb of the first coil segment $S1_{U1b\text{-}U6a}$ forming the second-innermost turn of the coil, inserted into the slot U1b at the position of the third layer, through an interturn connection.

The above is a fifth coil segment group forming one turn of the coil, and by repeating this for three turns, the coil reaches the sixth layer of the slot U2b, and the first slot insertion portion 10fa of the first coil segment $S1_{U3c\text{-}U2b}$ forming the outermost turn of the coil is inserted into the slot U2b at the position of the sixth layer to form the neutral point connecting portion 14-2.

In the coil starting from the slot U1c, the second slot insertion portion 10fb of the innermost first coil segment $S1_{U1c\text{-}U6b}$ inserted into the slot U1c at the position of the first layer forms the input portion 12-2, and the coil proceeds to the second layer of the slot U6b, the first layer of the slot U5b, the second layer of the slot U4a, the first layer of the slot U3a, and the second layer of the slot U2c. Then, the coil is electrically connected to the second slot insertion portion 10fb of the first coil segment $S1_{U1c\text{-}U6b}$ forming the second-innermost turn of the coil, inserted into the slot U1c at the position of the third layer, through an interturn connection.

The above is a sixth coil segment group forming one turn of the coil, and by repeating this for three turns, the coil reaches the sixth layer of the slot U2c, and the first slot insertion portion 10fa of the narrower second coil segment S2$_{U3a-U2c}$ forming the outermost turn of the coil is inserted into the slot U2c at the position of the sixth layer to form the neutral point connecting portion 14-2.

Here, as can be seen from a comparison of the connection paths of the three coils shown by the solid lines, the narrower second coil segment S2 is placed at a position straddling between the groups U5 and U6 in the coil starting from the slot U1A, the narrower second coil segment S2 is placed at a position straddling between the groups U3 and U4 in the coil starting from the slot U1B, and the narrower second coil segment S2 is placed at a position straddling between the groups U1 and U2 in the coil starting from the slot U1C, and positions of the coil segments in each of the coils circumferentially differs from one another by two groups of slots. Thus, the configuration in which the three slots of each of the groups accept insertion of one (slot insertion portion 10f of) coil segment per one turn from each of the coils, three coil segments in total, can be realized, and accordingly it is possible to make each coil electrically equivalent to one another. For making each coil electrically equivalent to one another, the same number, of coil segments inserted into each slot, contributes greatly.

In addition, even regarding the connection paths of the three coils shown by the broken lines, similarly to the coils shown by the solid lines, positions of the coil segments in each of the coils circumferentially differs from one another by two groups of slots. In comparison with the connection paths of the coils shown by the solid line, the narrower second coil segment S2 is placed at a position straddling between the groups U6 and U1 in the coil starting from the slot U1a, and positions of the coil segments thereof circumferentially differ from those of the coil starting from the slot U1A by one group of slots (although it is opposite to the case of the coils shown by the solid lines that the input portion 12-2 is on the first layer side and the neutral point connecting portion 14-2 is on the sixth layer side). The coils starting from the slots U1b and U1c have the same relationship with the coils starting from the slots U1B and U1C, respectively.

Therefore, each of the six coils of the U-phase circumferentially differs in its position from one another by one group of slots. Thus, the configuration in which the three slots of each of the groups accept insertion of one (slot insertion portion 10f of) coil segment per one turn from each of the six coils, six coil segments in total, can be realized, and accordingly it is possible to make each of the six coils electrically equivalent to one another. Also in this viewpoint, for making each coil electrically equivalent to one another, the same number, of coil segments inserted into each slot, contributes greatly.

Then, by making each coil electrically equivalent, it is possible to suppress generation of a circulating current with high accuracy.

According to the configuration of the present embodiment described above, such a coil can be realized by a simple configuration using two types of coil segments having different straddle widths.

In this embodiment, the straddle width Y1 of the first coil segment S1 is set at the width of ten slots, which is the number obtained by adding one to nine obtained by dividing the slot number of fifty-four by six which is the number of poles of the rotor (the nine corresponds to the interval between the corresponding slots of the adjacent groups), so that the connections between the slots A and B, and between the slots B and C, of adjacent groups, can be performed.

The straddle width Y2 of the second coil segment S2 is set at the width of seven slots obtained by subtracting two from the above nine, so that the connections between the slots C and A of adjacent groups can be performed.

Next, the connection between the coils of each phase will be described with reference to FIG. 8.

In FIG. 8, only portions regarding the U-phase coil are denoted by reference signs. The suffix I (abbreviation of IN) of each sign indicates the input portion 12 side of the coil, and the suffix O (abbreviation of OUT) indicates the neutral point connection portion 14 side of the coil. Further, "U" indicates a terminal for voltage application of the U-phase. The same applies to "V" and "W".

AI-AO in the U-phase indicates one coil having three turns starting from the slot U6A shown in FIG. 6, and aI-aO indicates one coil having three turns starting from the slot U1a. The connecting portion m1 between the AI-AO and the aI-aO indicates the connection (A-a) between the neutral point connecting portion 14-1 and the input portion 12-2 in FIG. 6. Incidentally, each of the input portion 12 and the neutral point connecting portion 14 are shown by common one box for the three coils in FIG. 6. However, the wiring itself is independent in each coil as can be seen from FIG. 5, and thus it is possible to connect respective coils to different connection destinations.

Further, BI-BO in the U-phase indicates one coil having three turns starting from the slot U6B shown in FIG. 6, and bI-bO indicates one coil having three turns starting from the slot U1b. The connecting portion m2 between the BI-BO and the bI-bO indicates the connection (B-b) between the neutral point connecting portion 14-1 and the input portion 12-2 in FIG. 6.

Further, CI-CO in the U-phase indicates one coil having three turns starting from the slot U6C shown in FIG. 6, and cI-cO indicates one coil having three turns starting from the slot U1c. The connecting portion m3 between the CI-CO and the cI-cO indicates the connection (C-c) between the neutral point connecting portion 14-1 and the input portion 12-2 in FIG. 6.

As can be seen from FIG. 8, in the stator 2, a series circuit of AI-AO and aI-aO, a series circuit of BI-BO and bI-bO, and a series circuit of CI-CO and cI-cO are connected in parallel to form a U-phase parallel circuit.

Corresponding parallel circuits are formed for the V-phase and the W-phase, respectively, and the take-out portions of these parallel circuits are connected at the neutral point N. That is, the parallel circuits for the three-phase (U-phase, V-phase, W-phase) are connected by a star connection.

By connecting each coil having three turns described with reference to FIG. 4 to FIG. 7 as described above, it is possible to easily manufacture parallel circuits for the three phases with a structure wherein all the slots 4 accept insertion of the same number of coil segments. In this configuration, since each coil having three turns is electrically equivalent to one another, the electrical balance in the parallel circuits can be kept, and thus it is possible to suppress generation of a circulating current.

Although the parallel circuits in three-parallel configuration are exemplified in FIG. 8, by changing the connections between the coils, it is also possible to form parallel circuits in six-parallel or two-parallel configuration. FIG. 9 shows an example of the six-parallel, and FIG. 10 shows an example of the two-parallel. In any of these configurations, it is common that each coil having three turns is electrically equivalent to one another, and that the electrical balance in the parallel circuit can be kept and thus it is possible to suppress generation of a circulating current. Therefore, with a slight change in the circuit configuration, it is possible to manufacture a variety of electrical rotating machines while suppressing generation of a circulating current.

The stator 2 as described above can be manufactured with necessary wire connection by: preparing the core 6 and the necessary coil segments S1 and S2; inserting the slot insertion portions 10f of each coil segment S1 and S2 from the coil end CE side into each slot 4 in the arrangement described with reference to FIG. 6; twisting the distal end portions of the slot insertion portions 10f protruding to the input portion ES side in different rotation directions with respect to each layer; electrically connecting the distal end portions after the twisting according to the pattern described with reference to FIG. 4 and FIG. 5, and electrically connecting the distal end portions forming the input portions 12 and the neutral point connection portions 14 according to the pattern described with reference to FIG. 8 or the like. Further, by combining the stator 2 with a rotor, an electrical rotating machine can be manufactured.

Next, a second embodiment will be described with reference to FIG. 11 and FIG. 12. Note that the same or corresponding parts as those of the first embodiment are denoted by the same reference signs, and descriptions of the same configurations and functions as those of the first embodiment will be omitted as appropriate.

In this embodiment, the straddle width Y1 of the first coil segment S1 is set at the width of eight slots, which is the number obtained by subtracting one from nine obtained by dividing the slot number of fifty-four by six which is the number of poles of the rotor (the nine corresponds to the interval between the corresponding slots of the adjacent groups), so that the connections between the slots B and A, and between the slots C and B, of adjacent groups, can be performed. In the configuration of the first embodiment, one slot and another slot one slot after the corresponding slot of the adjacent group are connected with each other when the first coil segment S1 is used, whereas in the configuration of the second embodiment, one slot and another slot one slot before the corresponding slot are connected with each other. This point is different from the first embodiment. However, in either case, it is common that one slot is connected with another slot, of the adjacent group, being adjacent to a slot corresponding to the one slot.

The straddle width Y2 of the second coil segment S2 is set at the width of eleven slots obtained by adding two to the above nine, so that the connections between the slots A and C of adjacent groups can be performed. In the configuration of the first embodiment, one slot and another slot two slots before the corresponding slot of the adjacent group are connected with each other when the second coil segment S2 is used, whereas in the configuration of the second embodiment, one slot and another slot two slots after the corresponding slot are connected with each other. This point is different from the first embodiment. However, in either case, it is common that one slot at an end of a certain group is connected with a slot at the other end of the adjacent group.

That is, in the first embodiment, two first coil segments S1 and one second coil segment S2 are used in this order to connect the slots in the order of the slot A→slot B→slot C→slot A, whereas in the second embodiment, one second coil segment S2 and two first coil segments S1 are used in this order to connect the slots in the order of the slot A→slot C→slot B→slot A. However, in either case, it is common that wiring passing through the slots A, B, and C twice each while passing through the six groups can be realized by the two first coil segments S1 and one second coil segment S2.

FIG. 11 and FIG. 12 shows an arrangement and connection structure of the coil segments forming six pieces of four-turn coils which form the U-phase coil, in the same format as FIG. 6 and FIG. 7, respectively. In the second embodiment, the number of turns is four per coil, and therefore, in this example, the slot insertion portions 10f are inserted into the slots 4 to form eight layers. FIG. 12 is a view showing the connection structure of only the eighth and seventh layers taken out from FIG. 11 and separated for each coil.

The connection structure shown in FIG. 11 is different from the case of the first embodiment in the connection orders of the slots besides the number of layers. That is, for example, the coil starting from the slot U1A is connected in the order of U1A→U2C→U3C→U4B→U5B→U6A by the three coil segments of $S2_{U1A-U2C}$, $S1_{U3C-U4B}$, and $S1_{U5B-U6A}$, and is further connected to the slot U1A of the next turn.

Similarly, the coil starting from the slot U1B is connected in the order of U1B→U2A→U3A→U4C→U5C→U6B by the three coil segments of $S1_{U1B-U2A}$, $S2_{U3A-U4C}$, and $S1_{U5C-U6B}$, and is further connected to the slot U1B of the next turn.

The coil starting from the slot U1C is connected in the order of U1C→U2B→U3B→U4A→U5A→U6C by the three coil segments of $S1_{U1C-U2B}$, $S1_{U3B-U4A}$, and $S2_{U5A-U6C}$, and is further connected to the slot U1C of the next turn.

As described above, even in the configuration of the second embodiment, it is common to the first embodiment that three slots of each of the groups accept insertion of one (slot insertion portion 10f of) coil segment per one turn from each of the coils. In the second embodiment, since the number of turns is four per coil, a total of four coil segments are inserted into each slot, and each coil can be made electrically equivalent to one another.

Further, it is also common to the first embodiment that the arrangement position of the three coils shown by the dashed lines differs from that of the three coils shown by the solid lines by 60°. Therefore, as a whole, the configuration in which the three slots of each of the groups accept insertion of one (slot insertion portion 10f of) coil segment per one turn from each of the six coils, eight coil segments in total, can be realized, and accordingly it is possible to make each of the six coils electrically equivalent to one another.

That is, in both the configuration of the first embodiment and the configuration of the second embodiment, each of the six coils can be made electrically equivalent to one another and generation of a circulating current can be suppressed with high accuracy, irrespective of the number of the turns of the coils.

Note that although different from the order of the letters, in the configuration of the second embodiment, slots C, B, and A correspond to the first to third slots, respectively.

Incidentally, in this type of electrical rotating machine, the neighboring layers in the radial direction of the core are twisted in opposite directions and electrically joined with each other. Therefore, if the end portions of the slot insertion portions of each layer are simply twisted in the direction determined for each layer, the twist direction will be different between the input portion 12-1 formed in the outer, even-numbered layer and the input portion 12-2 formed in the inner, odd-numbered layer, and thus these portions will be formed at distant positions. With this structure, when forming a power supply circuit from the outside to each coil segment forming each input portion 12, the connection structure will be complicated and will use larger amount of conductor, resulting in an uneconomical one.

As a technique for dealing with this problem, the applicant proposes, in Japanese patent application No. 2017-218645, a coil twisting method wherein only end portions of particular coil segments are left without twisting, or end portions of the particular coil segments are twisted in the same direction irrespective of the layers thereof.

By adopting the coil twisting method while deeming the end portions of the coil segments forming the input units 12 as the particular coil segments, a configuration wherein the input portions 12 on the inner side and the outer side face or come close to each other can be obtained, thereby the connection structure from the outside to the input portions 12 can be simplified and the amount of conductors used for the connections can be greatly saved.

For example, in the example of FIG. 1, the variant coil segments of the outermost layer are formed to have a length extending higher in the axial direction of the core 6 than other coil segments for connection after the twisting, and twisted in a direction opposite to the twisting of other coil segments for connection in the same layer to form the input portions U12-1 of the U-phase, the input portions V12-1 of the V-phase, and the input portions W12-1 of the W-phase.

On the other hand, the variant coil segments of the innermost layer are formed to have a length extending higher in the axial direction of the core 6 than other coil segments for connection after the twisting, and formed at a position facing or close to the input portions U12-1 of the U-phase, the input portions V12-1 of the V-phase, and the input portions W12-1 of the W-phase, as the input portions U12-2 of the U-phase, the input portions V12-2 of the V-phase, and the input portions W12-2 of the W-phase, respectively.

In each of the above-described embodiments, the configuration with fifty-four slots and six poles has been described, but the number of slots and the number of poles are not limited to this. For example, also in the conditions of ninety slots and ten poles, seventy-two slots and eight poles, or thirty-six slots and four poles, if the number of slots is nine times the number of poles, similar configurations to suppress occurrence of the circulating current with high accuracy can be obtained.

When the number of poles is 6×N (N is a natural number), the connection of exactly one turn of the stator 2 can be obtained by repeating N-times three coil segments in total of the two first coil segments S1 and one second coil segment S2, and accordingly wires of the six coils can be made equivalent to one another irrespective of the number of the turns, and accordingly it is particularly suitable. However, even in the cases of other numbers of poles, since it is possible to wire, for example, 1.5 turns in the case of four poles by the above three coil segments, wires of the six coils can be made equivalent to one another in the cases of multiples of three turns in which the above 1.5 turns are repeated twice. Alternatively, since it is possible to wire 0.75 turns in the case of eight poles, wires of the six coils can be made equivalent to one another in the cases of multiples of three turns in which the above 0.75 turns are repeated four times. Alternatively, if it is allowed that some slight end portions do not have equivalence, it is also possible to provide some coil segments which are not included in the repeat to apply the configurations of the above-described embodiments to the cases other than the above-described numbers of the turns.

Further, in the embodiments described above, the wiring in the case of forming a coil on the stator 2 of the electrical rotating machine has been described. However, even when forming a coil on a rotor of an electrical rotating machine, similar wiring can be adopted.

Further, in the above-described embodiments, examples wherein the slot insertion portion 10fb is located deeper than the slot insertion portion 10fa in FIG. 3A and FIG. 3B have been described. However, even if coil segments in which the slot insertion portion 10fa is located deeper than the slot insertion portion 10fb are used, it is possible to form a coil having the same configuration as that of the above-described embodiments and an electrical rotating machine including the same through the same idea as that described in the above-described embodiments, except that the coil turns in a direction opposite to the case of the above-described embodiments.

Preferred embodiments of the present invention are described above. However, the present invention is not limited to such specific embodiments, and various modifications and variations are conceivable. The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST

2 Stator
4 Slot
5 Insulating material
6 Core
10fa, 10fb Slot Insertion portion 10g Linking portion
S1, and S2 Coil segments
Y1, and Y2 Straddle width

The invention claimed is:
1. A wire connection method, for an electrical rotating machine, of forming parallel circuits for three phases and connecting the parallel circuits for the three phases by a star connection, by inserting first and second slot insertion portions of each of coil segments into a plurality of circumferentially arranged slots and electrically connecting distal ends of the coil segments in their insertion direction according to a predetermined pattern, each of the coil segments comprising the first and second slot insertion portions that are a pair of slot insertion portions and a linking portion connecting the first and second slot insertion portions, the method comprising
a first step of inserting
the coil segments to form one phase among the three phases into a plurality of groups of circumferentially consecutive three slots among the plurality of slots, the groups being circumferentially arranged at equal intervals,
so that first slot insertion portions of two first coil segments are respectively inserted into slots of certain groups, and second slot insertion portions of the two first coil segments are respectively inserted into slots of groups adjacent to the certain groups, the slots of the groups adjacent to the certain groups being adjacent to slots corresponding to the slots of the certain groups, and that a first slot insertion portion of a second coil segment is inserted into one slot at an end of another certain group, and a second slot insertion portion of the second coil segment is inserted into a slot at another end of a group adjacent to said another certain group, the one slot at the end of said another certain group and the slot at the another end of the group adjacent to said another certain group being either (i) two closest slots of two adjacent groups or (ii) two farthest apart slots of the two adjacent groups, and that same number of coil segments are inserted in each of the three slots of each group, and then electrically connecting the second slot insertion portion of one of said two first coil segments with the first slot insertion portion of another of said two first coil segments, and electrically connecting the second slot insertion portion of said another of said two first coil segments with the first slot insertion portion of the second coil segment.

2. The wire connection method for the electrical rotating machine according to claim 1, wherein the first step comprises a second step of forming a first coil segment group, as a part of the coil segments to form the one phase, with respect to a first slot, a second slot, and a third slot that are three slots aligning in a first direction from one end to another end in each of the groups, and to a first group, a second group, a third group, a fourth group, and a fifth group, and a sixth group that are six groups disposed in a second direction in this order among the plurality of groups, the second direction being a same direction as the first direction or an opposite direction of the first direction, by: inserting the first slot insertion portion of said one first coil segment into the first slot of the first group; inserting the second slot insertion portion of said one first coil segment into the second slot of the second group;

inserting the first slot insertion portion of said another first coil segment into the second slot of the third group; inserting the second slot insertion portion of said another first coil segment into the third slot of the fourth group;

inserting the first slot insertion portion of said second coil segment into the third slot of the fifth group; inserting the second slot insertion portion of said second coil segment into the first slot of the sixth group;

electrically connecting the second slot insertion portion inserted into the second slot of the second group with the first slot insertion portion inserted into the second slot of the third group; and electrically connecting the second slot insertion portion inserted into the third slot of the fourth group with the first slot insertion portion inserted into the third slot of the fifth group.

3. The wire connection method for the electrical rotating machine according to claim 2, wherein the first step comprises a third step of, with respect to M that is a natural number, forming (M+1) pieces of the first coil segment groups, by inserting, for each natural number X from 1 to M, each slot insertion portion of each coil segment to form (X+1)-th first coil segment group into the slots so as to overlap with each slot insertion portion of each coil segment forming X-th first coil segment group, and electrically connecting the second slot insertion portion, of the X-th first coil segment group, inserted into the first slot of the sixth group with the first slot insertion portion, of the (X+1)-th first coil segment group, inserted into the first slot of the first group.

4. The wire connection method for the electrical rotating machine according to claim 2, wherein the second step is a step of further forming a second coil segment group in which positions of each coil segment circumferentially differ from those in the first coil segment group by two groups of the slots, and a third coil segment group in which positions of each coil segment further circumferentially differ from those in the second coil segment group by two groups of the slots such that the three slots of each of the groups accept insertion of one slot insertion portion of the coil segment from each of the first to third coil segment groups.

5. The wire connection method for the electrical rotating machine according to claim 4, wherein the second step is a step of further forming fourth to sixth coil segment groups in which positions of each coil segment circumferentially differ from those in the first to third coil segment groups by one group of the slots, respectively, such that the three slots of each of the groups accept insertion of one slot insertion portion of the coil segment from each of the first to sixth coil segment groups.

6. The wire connection method for the electrical rotating machine according to claim 1, wherein number of the slots is fifty-four and number of poles of the electrical rotating machine is six.

7. The wire connection method for the electrical rotating machine according to claim 1, wherein the first step is a step of respectively inserting the first and second slot insertion portions of the two first coil segments into two slots which are circumferentially ten slots distant from each other, and respectively inserting the first and second slot insertion portions of the second coil segment into two slots which are circumferentially seven slots distant from each other.

8. The wire connection method for the electrical rotating machine according to claim 1, wherein the first step is a step of respectively inserting the first and second slot insertion portions of the two first coil segments into two slots which are circumferentially eight slots distant from each other, and respectively inserting the first and second slot insertion portions of the second coil segment into two slots which are circumferentially eleven slots distant from each other.

9. A method of manufacturing an electrical rotating machine comprising a coil, wherein the coil is wired according to the wire connection method for the electrical rotating machine according to claim 1.

10. A wire connection structure of an electrical rotating machine, the electrical rotating machine comprising:

a plurality of circumferentially arranged slots; and coil segments respectively comprising first and second slot insertion portions that are a pair of slot insertion portions, and a linking portion connecting the first and second slot insertion portions, the first and second slot insertion portions being respectively inserted into the slots, wherein distal ends of the first and second slot insertion portions in their insertion direction are electrically connected according to a predetermined pattern to form parallel circuits for three phases, and the parallel circuits for three phases are connected by a star connection, wherein the coil segments to form one phase among the three phases are inserted into a plurality of groups of circumferentially consecutive three slots among the plurality of slots, the groups are circumferentially arranged at equal intervals, the wire connection structure comprising:

the plurality of coil segments including two first coil segments and a second coil segment, first slot insertion portions of the two first coil segments are respectively inserted into slots of certain groups, second slot insertion portions of the two first coil segments are respectively inserted into slots of groups adjacent the certain groups, the slots of the groups adjacent to the certain groups being adjacent to slots corresponding to the slots of the certain groups, a first slot insertion portion of the second coil segment is inserted into one slot at an end of another certain group, and a second slot insertion portion of the second coil segment is inserted into a slot at another end of a group adjacent to said another certain group, the one slot at the end of said another certain group and the slot at the another end of the group adjacent to said another certain group being either (i) two closest slots of two adjacent groups or (ii) two farthest apart slots of the two adjacent groups, same number of coil segments are inserted in each of the three slots of each group, and the second slot insertion portion of one of said two first coil segments is electrically connected with the first slot insertion portion of another of said two first coil segments, and the second slot insertion portion of said another of said two first coil segments is electrically connected with the first slot insertion portion of the second coil segment.

11. The wire connection structure of the electrical rotating machine according to claim 10, wherein, with respect to a first slot, a second slot, and a third slot that are three slots aligning in a first direction from one end to another end in each of the groups, and to a first group, a second group, a third group, a fourth group, and a fifth group, and a sixth group that are six groups disposed in a second direction in this order among the plurality of groups, the second direction being a same direction as the first direction or an opposite direction of the first direction, the coil segments forming the one phase include a first coil segment group formed by said one first coil segment, said another first coil segment, and said second coil segment, the first slot insertion portion of said one first coil segment is inserted into the first slot of the first group, the second slot insertion portion of said one first coil segment is inserted into the second slot of the second group, the first slot insertion portion of said another first coil segment is inserted into the second slot of the third group, the second slot insertion portion of said another first coil segment is inserted into the third slot of the fourth group, the first slot insertion portion of said second coil segment is inserted into the third slot of the fifth group, the second slot insertion portion of said second coil segment is inserted into the first slot of the sixth group, the second slot insertion portion inserted into the second slot of the second group and the first slot insertion portion inserted into the second slot of the third group are electrically connected with each other, and the second slot insertion portion inserted into the third slot of the fourth group and the first slot insertion portion inserted into the third slot of the fifth group are electrically connected with each other.

12. The wire connection structure of the electrical rotating machine according to claim 11, with respect to M that is a natural number, comprising (M+1) pieces of the first coil segment groups, wherein, for each natural number X from 1 to M, each slot insertion portion of each coil segment forming (X+1)-th first coil segment group is inserted into the slots so as to overlap with each slot insertion portion of each coil segment forming X-th first coil segment group, and the second slot insertion portion, of the X-th first coil segment group, inserted into the first slot of the sixth group and the first slot insertion portion, of the (X+1)-th first coil segment group, inserted into the first slot of the first group are electrically connected with each other.

13. The wire connection structure of the electrical rotating machine according to claim 11, comprising:

a second coil segment group in which positions of each coil segment circumferentially differ from those in the first coil segment group by two groups of the slots; and a third coil segment group in which positions of each coil segment further circumferentially differ from those in the second coil segment group by two groups of the slots, wherein the three slots of each of the groups accept insertion of one slot insertion portion of the coil segment from each of the first to third coil segment groups.

14. The wire connection structure of the electrical rotating machine according to claim 13, comprising fourth to sixth coil segment groups in which positions of each coil segment circumferentially differ from those in the first to third coil segment groups by one group of the slots, respectively, wherein the three slots of each of the groups accept insertion of one slot insertion portion of the coil segment from each of the first to sixth coil segment groups.

15. The wire connection structure of the electrical rotating machine according to claim 10, wherein number of the slots is fifty-four and number of poles of the electrical rotating machine is six.

16. The wire connection structure of the electrical rotating machine according to claim 10, wherein the first and second slot insertion portions of the two first coil segments are respectively inserted into two slots which are circumferentially ten slots distant from each other, and the first and second slot insertion portions of the second coil segment are respectively inserted into two slots which are circumferentially seven slots distant from each other.

17. The wire connection structure of the electrical rotating machine according to claim 10, wherein the first and second slot insertion portions of the two first coil segments are respectively inserted into two slots which are circumferentially eight slots distant from each other, and the first and second slot insertion portions of the second coil segment are respectively inserted into two slots which are circumferentially eleven slots distant from each other.

18. An electrical rotating machine comprising the wire connection structure according to claim 10.

* * * * *